(12) United States Patent  
Furubayashi

(10) Patent No.: US 6,427,455 B1
(45) Date of Patent: Aug. 6, 2002

(54) COOLING DEVICE AND ITS COOLING METHOD

(75) Inventor: Yasuo Furubayashi, Osaka (JP)

(73) Assignee: Light Shoki Kabushiki Kaisha, Yamaguchi (JP)

( * ) Notice: Subject to any disclaimer, the term of this patent is extended or adjusted under 35 U.S.C. 154(b) by 0 days.

(21) Appl. No.: 09/646,557

(22) PCT Filed: Mar. 17, 1999

(86) PCT No.: PCT/JP99/01343

§ 371 (c)(1),
(2), (4) Date: Sep. 19, 2000

(87) PCT Pub. No.: WO99/47871

PCT Pub. Date: Sep. 23, 1999

(30) Foreign Application Priority Data

Mar. 19, 1998 (JP) .............................................. 10/70693
Apr. 27, 1998 (JP) .......................................... 10/117527

(51) Int. Cl.⁷ .............................................. F25D 17/06
(52) U.S. Cl. .............................. 62/93; 62/186; 62/180
(58) Field of Search ............................ 62/93, 180, 186

(56) References Cited

U.S. PATENT DOCUMENTS

| 2,319,878 A | | 5/1943 | Philipp ........................ 62/102 |
| 4,003,729 A | | 1/1977 | McGrath ........................ 62/93 |
| 5,029,450 A | * | 7/1991 | Takano et al. ................. 62/239 |
| 5,065,592 A | * | 11/1991 | Takano et al. ................. 62/180 |
| 5,157,941 A | | 10/1992 | Cur et al. ...................... 62/441 |
| 6,082,131 A | * | 7/2000 | Hirosawa et al. .............. 62/448 |
| 6,140,611 A | * | 10/2000 | Penard ........................ 219/385 |

FOREIGN PATENT DOCUMENTS

| DE | 2 304 332 | 8/1974 | |
| DE | 29 09 860 | 9/1980 | |
| EP | 0 637 724 A1 | 2/1995 | ........... F25B/39/02 |
| JP | 57-43782 | 3/1982 | |
| JP | 60-123579 | 8/1985 | |
| JP | 62-169988 | 7/1987 | |
| JP | 6-273030 | 9/1994 | |

* cited by examiner

Primary Examiner—William Doerrler
Assistant Examiner—Mark Shulman
(74) Attorney, Agent, or Firm—Rosenthal & Osha L.L.P.

(57) ABSTRACT

A cooling device is disclosed capable of reducing the amount of frost deposited on a cooling coil (7), wherein cooling fans (8a, 8b) are disposed at the front of the cooling coil (7), most of the flowing air discharged into a cooling chamber is discharged again into the cooling chamber by the cooling fans (8a, 8b) without being returned to the cooling coil (7), dry cooling air in the cooling coil (7) is sucked from the rear of the cooling fans (8a, 8b) and discharged into the cooling chamber, an air volume corresponding to the volume of sucked air passed through the cooling coil (7) is fed from the cooling chamber to the cooling coil (7) through areas not occupied by the cooling fans (8a, 8b), and the air feeding speed is so set as to permit vapor generated in the cooling chamber to solidity until the vapor is brought into contact with the surface of the cooling coil (7).

25 Claims, 14 Drawing Sheets

COOLING DEVICE AND ITS COOLING METHOD

TECHNICAL FIELD

This invention relates to a cooling device to cool materials by circulating cold air with a cooling fan and also relates to a method of cooling with the device. Specifically, this invention relates to a cooling device used for freeze-storing foodstuff, a cooling device that cools materials during the conveyance, and a method of cooling with the cooling device.

BACKGROUND ART

In cooling devices such as freezers, a forced cold air circulating system is used for cooling. Air cooled by a cooling coil is forced to circulate by a cooling fan in a cooling chamber. Therefore, the cooling chamber has less inner temperature irregularity and cooling time is decreased.

For example, in a conventional freezer, a partition divides the inner space into a cooling coil part having a cooling coil such as a fin-tube type and a cooling fan, and a freezing chamber for freeze-storing foodstuff. The cooling coil is connected with a compressor, a condenser, or the like. A refrigerant circulates in these elements and evaporates in the cooling coil.

To circulate cold air between the freezing chamber and the cooling coil part, a ventilation port and a suction port are provided. The ventilation port discharges cold air from the cooling coil into the freezing chamber while the suction port sucks cold air of the freezing chamber into the cooling coil.

Air cooled by the cooling coil is discharged into the freezing chamber by the cooling fan via the ventilation port. Foodstuffs inside the freezing chamber are cooled with the cold air flowing in the freezing chamber. The air heated by heat exchange with the foodstuffs is sucked by the suction port into the cooling coil part, cooled again by the cooling coil, and ventilated into the freezing chamber.

An example of conventional cooling devices to cool food in the conveyance by means of this cooling method is mentioned more specifically in the following. Cooling devices that cool food during the conveyance include spiral freezers, tunnel freezers, or the like. A spiral freezer cools food on a belt moving spirally by a rotating drum in a thermal insulating box. A tunnel freezer cools food on a belt moving horizontally in a thermal insulating box.

FIG. 11 shows a cross section in a horizontal direction of a conventional spiral freezer. A thermal insulating box 21 is formed by filling a thermal insulator 23 between metal plates 22. A food inlet 24 and a food outlet 25 are formed in the thermal insulating box 21. A belt-driving plate 28 is attached spirally to the outer periphery of a rotating drum 27 that rotates around a shaft 26 (FIG. 12). A belt 29 is mounted on the belt-driving plate 28.

A food delivery belt 30 is provided to the food outlet 25. The rotating drum 27 integrated with the belt-driving plate 28 is placed in a tubular drum case 31. A cooling unit case 32 is connected to the drum case 31.

Inside the cooling unit case 32, a cooling coil 33, cooling fans 34, an air course 35 for discharging cold air, and an air course 36 for sucking cold air are formed. Typically, the cooling coil 33 is a fin-tube.

FIG. 12 shows a cross-section in the vertical direction of the conventional spiral freezer shown in FIG. 11. A rotating drum 27 is disposed inside the drum case 31 with an attachment column (not shown) in order to rotate around the shaft 26.

FIG. 13 shows a cross section taken along a line I—I of FIG. 11. In FIG. 13, the cross-section along the line I—I is overlapped with a cross section comprising the food inlet 24 part and the food outlet 25 part in order to clarify the condition of the food conveyance. The cooling coil 33 is connected with a compressor, a condenser, etc (not shown). A refrigerant circulates in these elements, and evaporates in the cooling coil 33.

A process for cooling food is explained below by referring mainly to FIG. 11. First, a foodstuff is delivered into the thermal insulating box 21 from the food inlet 24. The foodstuff is mounted on the belt 29 and moves in a direction indicated by an arrow 'a'. The belt 29 is shaped like a ring as a whole and mounted by being combined with the belt-driving plate 28.

As shown in FIG. 13, when the food conveying drum 27 rotates, the belt 29 moves upward along the surface of the spirally-shaped belt-driving plate 28 due to an extruding force created by the rotation of the belt-driving plate 28 integrated with the food conveying drum 27, and also by a drawing force of the belt 29 provided by a separate driving power source. As the belt 29 is shaped like a ring, it circulates on the belt-driving plate 28. A foodstuff 38, which reaches the top step of the belt-driving plate 28 due to the moving belt 29, continues to move in a direction indicated by an arrow 'b' to the food outlet 25, and delivered with a food delivery belt 30 out of the thermal insulating box 21. In this process of the upward move of the foodstuff 38 at the food conveying drum 27, the foodstuff 38 is cooled.

As shown in FIG. 11, cold air from the cooling coil 33 is discharged by the cooling fans 34 in a direction indicated by arrows labeled 'c'. The cold air then passes through an air course 35 for discharging cold air and discharged into the drum case 31. Cold air in the drum case 31 moves up the respective steps of the belt-driving plate 28 along the inner wall of the drum case 31 so that the foodstuff on the belt 29 is cooled. The foodstuff 38 is cooled continuously while it moves from the bottom step to the top step of the belt-driving plate 28, and thus cooling is completed by the time the food reaches the top step.

In the drum case 31, the cold air is heated by heat exchange with the foodstuff and returns to the cooling coil 33 through a cold air suction part 36. The returning air is cooled again by the cooling coil 33 and discharged by means of the cooling fans 34 in the direction indicated by the arrows labeled 'c'.

To ventilate cold air uniformly from the bottom to the top steps of the belt-driving plate 28, the height of the cooling coil 33 is adjusted to be substantially equal to the height from the bottom to the top step of the belt-driving plate 28, and a plurality of cooling fans 34 are arranged to substantially cover the entire surface of the front of the cooling coil 33 as shown in FIG. 12.

FIG. 14 shows a vertical cross-section in the longitudinal direction of a conventional tunnel freezer. A thermal insulating box 39 is formed by filling a thermal insulator 40 between metal plates 41. In the upper portion of the thermal insulating box 39, a plurality of cooling coils 42 are aligned in the longitudinal direction.

At the rear of respective cooling coils, cooling fans 43 are arranged. A continuous belt 44 for conveying foodstuffs circulates by moving horizontally in the thermal insulating box 39. Additionally, a food inlet 45 and a food outlet 46 are formed in the thermal insulating box 39.

First, when foodstuff is mounted on the belt 44 at the front of the food inlet 45, the foodstuff passes the food inlet 45 together with the moving belt 44 and moves in the thermal insulating box 39 in a direction indicated by an arrow 'd'. Cold air discharged from the cooling coil 42 in a direction indicated by an arrow 'e' by the cooling fans 43 moves in the directions indicated by arrows 'f', 'd', and 'g', and returns to the rear of the cooling fans 43. The returning air passes through the respective cooling coils 42 sequentially to be discharged again in the 'e' direction. By means of such a circulation of cold air, foodstuffs on the belt 44 are cooled while being moved in the 'd' direction.

The above explanation is about an example of conventional cooling devices. In such cooling devices, the temperature of air returning to a cooling coil increases due to heat exchange with foodstuff, and the air contains vapor generated from the foodstuffs. When the returning air is cooled again by the cooling coil, moisture in the returning air will be frosted and will adhere to the cooling coil.

Because a large amount of frost deposited on the cooling coil deteriorates the cooling performance, defrosting is carried out by using a separate defrosting heater. However, this method of defrosting may involve manual operation. Cooling operation must be stopped at defrosting, so this will deteriorate cooling efficiency. Lowering efficiency has been a problem in cooling a large amount of food.

In such a conventional spiral freezer, heat exchange is carried out by passing air through a cooling coil. Therefore, it requires an air course to introduce returning cold air to the rear of the cooling coil and also an air course to introduce discharged air into a drum case. As a result, a certain space for the air courses should be provided in the front and the rear of the cooling coil in addition to a space for housing the cooling unit. Thus, the device inevitably becomes large.

When a large cooling coil is provided to improve the cooling performance, the entire device will increase in size. Therefore, space-saving has been difficult to accomplish, especially for a device for rapid cooling.

In a conventional tunnel freezer as mentioned above, cooling units are aligned along the longitudinal direction of the belt. Therefore, when the number of the cooling units is increased for improving the cooling performance, the device will be extended in the longitudinal direction by the number of the increased cooling units. As a result, it has been difficult to save space in a tunnel-freezer, especially one for rapid cooling.

DISCLOSURE OF THE INVENTION

To solve the problems in the conventional methods, embodiments of the present invention provides a cooling device that can decrease frost deposits on a cooling coil by solidifying vapor in cold air before the air returns into the cooling coil in order to omit the necessity of defrosting in a steady state. The present invention also provides a cooling method using the device. Embodiments of the invention also provide a cooling device that enables rapid cooling with a smaller space and reduces frost deposited on the cooling coil, and also a cooling method using the device.

A first cooling device in accordance with one embodiment of this invention comprises a thermal insulating box, a cooling coil part of a cooling coil disposed on at least one inner wall of the thermal insulating box, a fan arranged in front of the cooling coil part, and a cooling chamber as a space in front of the fan. The fan discharges air into the cooling chamber to flow therein. In the cooling device, dry-cooling air present in the cooling coil part is sucked from the rear of the fan and discharged into the cooling chamber. An air volume corresponding to the volume of sucked air passed through the cooling coil part is fed from the cooling chamber to the cooling coil part through areas not occupied by the cooling fan. The air feeding speed is set so as to permit vapor generated in the cooling chamber to solidify until the vapor (moisture) is brought into contact with the surface of the cooling coil.

In such a cooling device, most of the cold air in the cooling chamber circulates in the same cooling chamber without returning to the inside of the cooling coil, so that most vapor generated in the cooling chamber will solidify in the cooling chamber. Furthermore, cold air returning to the inside of the cooling coil is also cooled in front of the cooling coil before it makes contact with the same coil, and thus, most vapor in the returning cold air will solidify. Therefore, absolute volume of the vapor included in the cold air returning to the cooling coil is subtle in volume, and it is removed further before the cooled air returns to the cooling coil. As a result, amount of frost deposited on the cooling coil can be considerably reduced.

Preferably in the cooling device, the speed for the vapor to solidify before a contact with the cooling coil surface (wind speed) is more than 0 m/min. but not more than 5 m/min.

Accordingly, most of the vapor can solidify by cooling cold air before returning into the cooling coil.

Preferably, a speed for the vapor to solidify before a contact with the cooling coil surface (wind speed) is from 0.5 m/min. to 3.5 m/min. Accordingly, most of the vapor can solidify by cooling cold air before the air returns into the cooling coil.

Preferably, the speed of airflow sucked from the cooling coil is greater than the speed of airflow fed to the cooling coil part. Accordingly, most of the vapor can solidify by cooling cold air fed to the cooling coil before the air returns into the cooling coil.

Preferably, the area of airflow sucked from the cooling coil part is smaller than that of airflow fed to the same cooling coil part. Accordingly, the speed of the cold airflow fed to the cooling coil part can be reduced.

Preferably, a plurality of the cooling fans are arranged in front of the cooling coil, and the respective cooling fans are attached in an inclined state to the cooling coil so that cold air discharged from the cooling fans will intersect. Accordingly, cold air can be concentrated on a material to be cooled, and it is further advantageous for rapid cooling.

Preferably, a clearance is formed between the rear of the cooling coil and the inner wall of the chamber. Accordingly, the sucked air can be easily introduced to the rear of the fans.

Preferably, the clearance ranges from 20 to 50 mm. Accordingly, the cold air can be prevented from diffusing in the clearance, and sufficient volume of cold air can be flown.

Preferably, the cooling device is selected from the group consisting of a refrigerator, a freezer, a refrigeration device, a refrigeration device for a automatic vending machine, a cold storage, a cool-keeping car, and a freezer car.

Preferably, the refrigerator and the freezer are for intended home use.

Preferably in the respective cooling devices, input of heaters is not necessary to defrost the cooling coil in a steady state. Accordingly, cooling efficiency can be improved since the temperature in the cooling chamber will not be raised due to heating with a heater.

Preferably, the cooling device further comprises a partition to divide the inside of the thermal insulating box into a cooling space and an inner wall side space positioned outside this cooling space, and a ventilating hole to flow air between the cooling space and the inner wall side space, in which the cooling coil is arranged with its rear facing the inner wall side space, with its side being adjacent to the inner wall and the front being incorporated into the inner periphery of an opening formed at the partition. In the device, cooling fans are arranged in front of the cooling coil, and the cooling fans are set to rotate in the direction to discharge air behind the fans directly toward the same fans.

Accordingly, most of the cold air in the cooling chamber will circulate in the cooling chamber without returning to the cooling coil inside. Therefore, most of the vapor generated in the cooling chamber solidifies in the cooling chamber, and the amount of frost depositing on the cooling coil can be decreased. Moreover, it is not necessary to provide any special spaces for an air course to circulate cold air in the front or the rear of the cooling coil, and thus it can save space.

Preferably in the cooling device, cold air discharged from the cooling fans is reflected by the wall facing the cooling fans in order to return to the cooling fan part. Accordingly, cold air discharged into the cooling space can be returned easily to the cooling coil side.

Preferably, the cooling device further comprises a means to convey a material to be cooled in the cooling space, and the cooling fans are disposed adjacent to the conveying means. Accordingly, cold air can be discharged directly to the material, and rapid cooling can be carried out.

Preferably, the cooling device further comprises a rotating drum arranged in the cooling space and also a belt-driving plate attached spirally to this rotating drum, in which the conveying means is a belt that circulates while moving spirally on the belt-driving plate due to the rotation of the rotating drum. Accordingly, even a cooling device to convey materials spirally can save space and enables rapid cooling and reduces frost deposited on the cooling coils.

Preferably, the cooling device comprises a plurality of rotating drums, and the rotating drums are provided respectively with cooling coils and cooling fans. The adjacent belt-driving plates of rotating drums are positioned spirally in the direction opposite to each other. The belt is bridged from a belt-driving plate to the adjacent belt-driving plate, and the belt circulates while moving on the belt-driving plates of the respective rotating drums by the rotation in the same direction of the rotating drums. Accordingly, the cooling period in the device can be extended, and consequently cooling performance can be improved.

Preferably, the device has even numbers of the rotating drums, and the inlet and the outlet for materials are formed at substantially the same height in the thermal insulating box. Since such a cooling device does not need a belt to lower a lifted material outside the device, the equipment can be simplified.

Preferably, a plurality of the cooling coils and the cooling fans are arranged along the outer periphery of the belt-driving plate. Accordingly, the cooling performance can be improved as well as a space at the outer periphery of the belt-driving plate can be utilized, and the cooling coils will be extended less in the longitudinal direction, and therefore help save space.

Preferably, the cooling coils are disposed at substantially the same height of the bottom to the top steps of the belt-driving plate, and the plural cooling fans are arranged in front of the cooling coil so that the volume of the air ventilated to the respective steps of the belt-driving plate is equalized substantially. Accordingly, the materials are cooled continuously while it is transferred from the lowest to the top steps of the belt-driving plate, and the cooling performance can be improved.

Preferably, a stopper to prevent sliding of the material is provided on the belt. Accordingly, materials can be prevented from sliding off when the belt is frozen.

Preferably in the cooling device, the conveying means is a belt that circulates while moving in the horizontal direction. Accordingly, even a cooling device to convey materials in the horizontal direction can save space, and enables rapid cooling and reduces frost deposited on the cooling coils.

If the conveying means of a cooling device is a circular belt that circulates while moving in the horizontal direction, the cooling coils are disposed preferably at the both sides of the belt. Accordingly, the cooling performance can be improved while the device is extended less in the longitudinal direction, and thus, space-saving and rapid cooling can be realized.

Preferably the respective cooling fans are disposed at both sides of the belt in front of the cooling coil, and the cooling fans face each other with the belt therebetween. Accordingly, cold air will be overlapped in the cooling space, and this is a further advantage for rapid cooling.

Next, a cooling method of the present invention is provided by using a cooling device comprising a thermal insulating box, a cooling coil part of a cooling coil disposed on at least one inner wall of the thermal insulating box, a fan arranged in front of the cooling coil part, and a cooling chamber as a space in front of the fan. In this method, air is discharged by the fans into the cooling chamber and most of the flowing air is discharged again into the cooling chamber without returning into the cooling coil. This method is characterized in that the flowing air is discharged again into the cooling chamber and the flowing air sucked from the cooling coil are joined before they are discharged into the cooling chamber.

In the above-mentioned cooling method, discharged cold airs different in temperature join and exchange heat between them. As a result, cold air directly heading from the cooling space for the rear of the fans is cooled with the other cold air that is sucked directly from the cooling coil, and a predetermined volume of vapor can solidify in the cooling space.

Preferably in the cooling method using the cooling device, an air volume corresponding to the volume of sucked air passed through the cooling coil is fed from the cooling chamber to the cooling coil through areas not occupied by the cooling fans, and the feeding speed is set so as to permit vapor generated in the cooling chamber to solidify by the time the vapor is brought into contact with the surface of the cooling coil.

Accordingly, most of the vapor in the returning cold air solidifies before contacting with the cooling coil, and frost deposited on the cooling coil can be reduced significantly.

In addition, the speed that the vapor solidifies by the time to contact with the cooling coil surface (wind speed) is preferably more than 0 m/min., but not more than 5 m/min. Accordingly, cold air returning to the inside of the cooling coil is cooled before it returns into the cooling coil so that most of the vapor can solidify.

It is also preferable that the speed that the vapor solidifies by the time to contact with the cooling coil surface (wind speed) is from 0.5 m/min. to 3.5 m/min. Accordingly, cold air returning to the inside of the cooling coil is cooled before it returns into the cooling coil so that the most of the vapor can solidify.

DETAILED DESCRIPTION OF THE INVENTION

An embodiment of a cooling device of the present invention will be further described below with reference to the attached drawings.

First Embodiment

Figure 1:
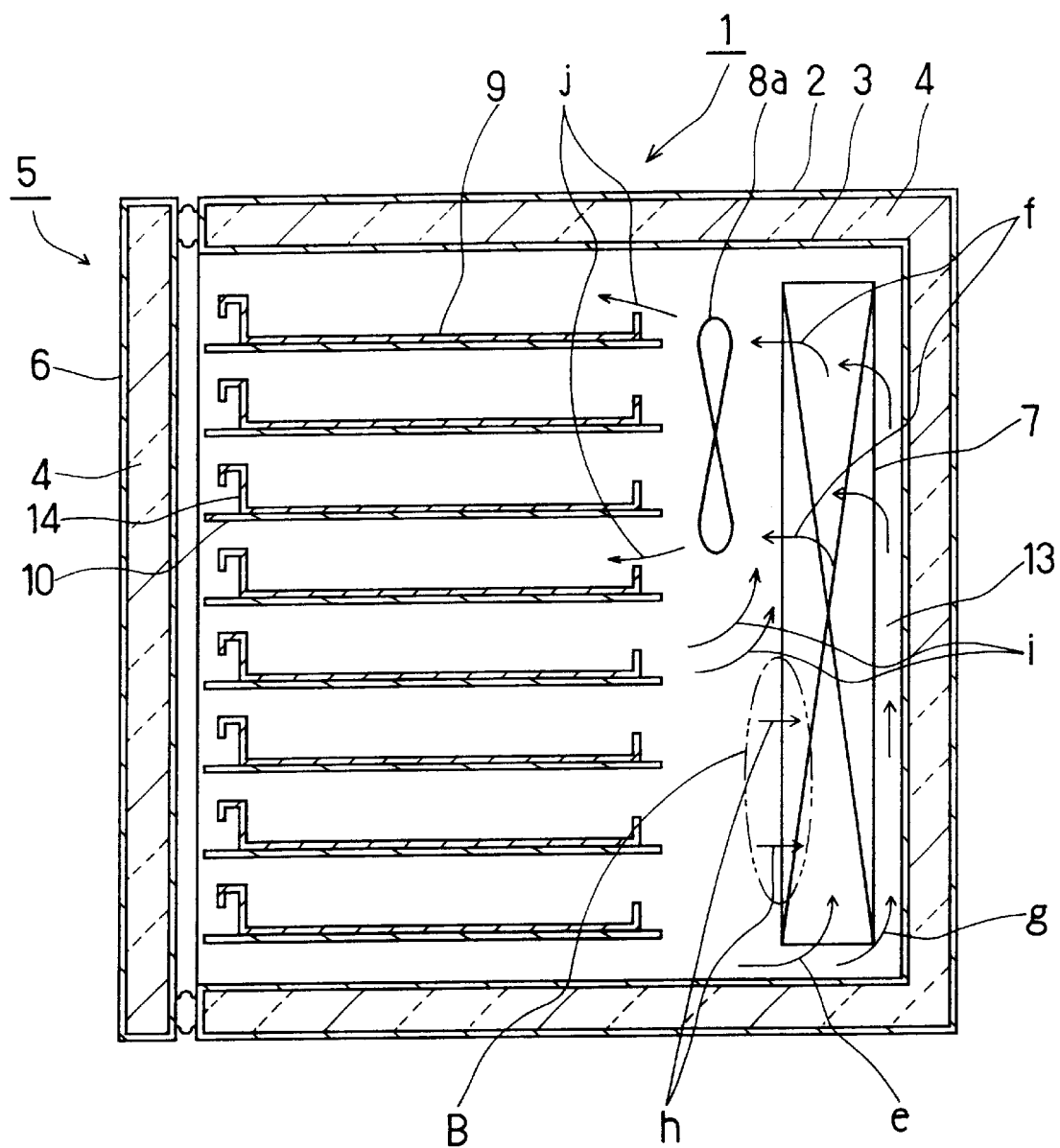
FIG. 1 is a vertical cross-sectional view in the fore-and-aft direction of an embodiment of a cooling device in the present invention.

In this embodiment, the present invention is applied to a freezer. FIG. 1 is a vertical cross-sectional view in the fore-and-aft direction according to this embodiment. A thermal insulating box 1 is formed with an outer box 2, an inner box 3, and a thermal insulator 4 filled therebetween. A door 5 is formed similarly by filling the thermal insulator 4 in a door panel 6.

A cooling coil 7 stands at the rear of the freezer. In front of the cooling coil 7, cooling fans 8a and 8b (FIG. 2) are arranged. The cooling fan 8b is omitted from FIG. 1 to indicate clearly the flow of the cold air.

A freezing chamber is positioned in front of the cooling fans 8a and 8b in the freezer, on which trays 9 for placing food are disposed. The trays 9 are mounted on guide rails 10 formed at both sides of the freezer and the trays can be taken out from the freezer.

Figure 2:
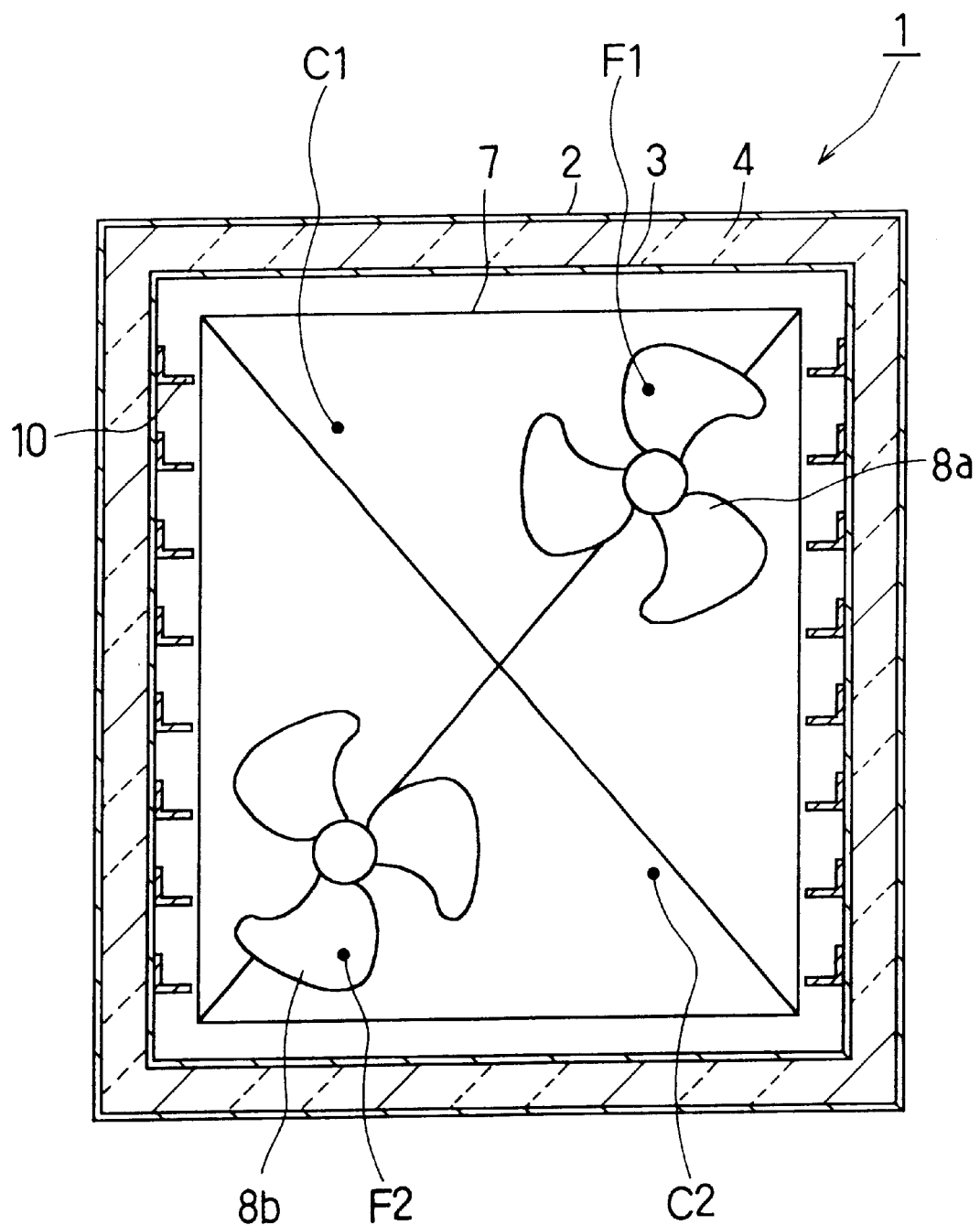
FIG. 2 is a vertical cross-sectional view of the cooling device of FIG. 1 in the lateral direction.

FIG. 2 is a vertical cross-sectional view taken in the lateral direction of the freezer of FIG. 1. The trays 9 are omitted for clarity. The cooling fan 8a is arranged on the upper-half while the cooling fan 8b is arranged on the lower-half respectively of the cooling coil 7, and the centers of the cooling fans 8a and 8b are positioned on an identical diagonal of the cooling coil 7. The cooling fans 8a and 8b are set to rotate in a direction to discharge air behind the fans forward.

Figure 3:
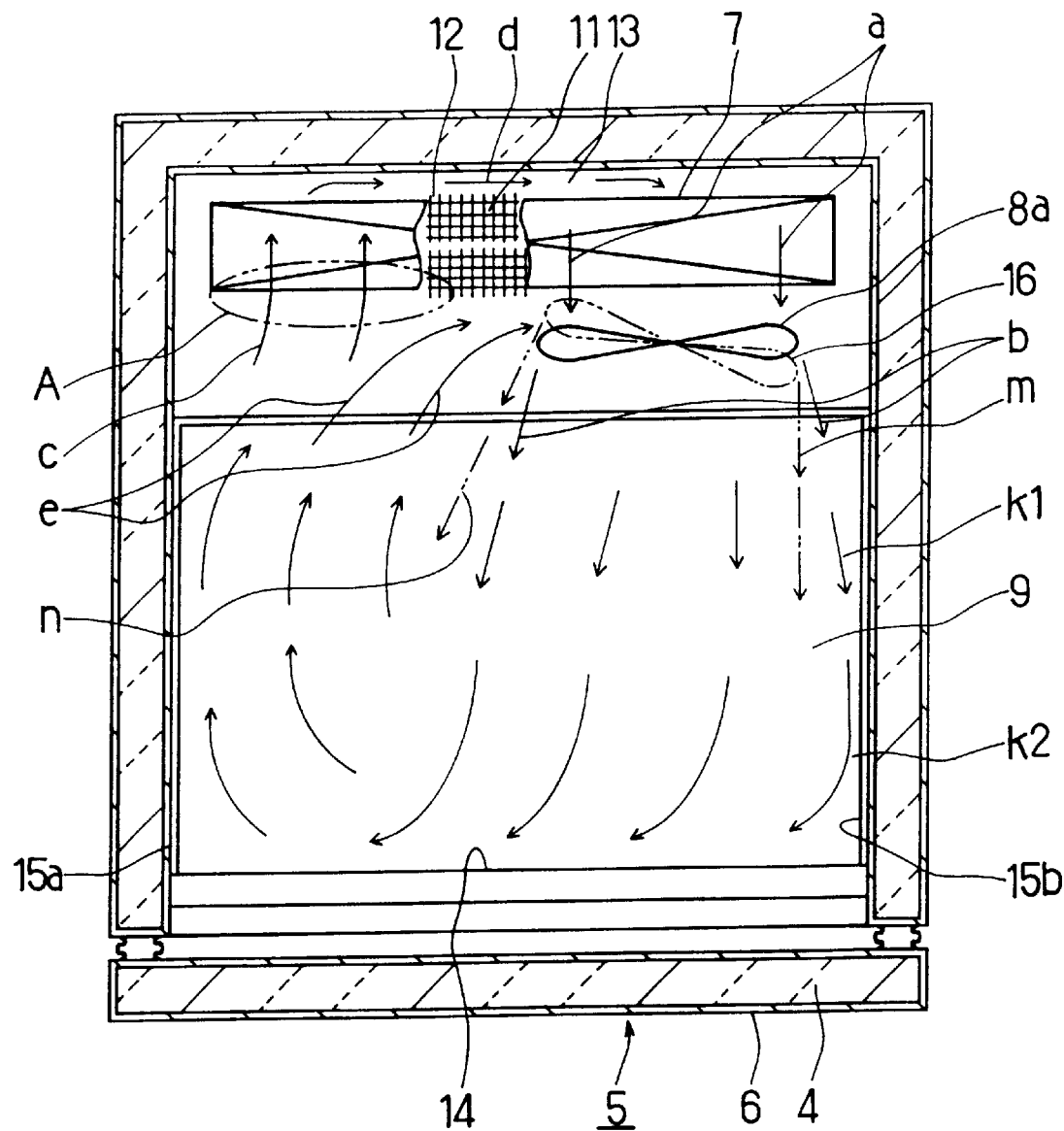
FIG. 3 is a horizontal cross-sectional view of the cooling device of FIG. 1.

FIG. 3 is a cross-sectional view in the horizontal direction of the upper-half of the cooling coil 7. The cooling fan 8b is omitted for clarity. Circulation of cold air in such a freezer will be explained below referring to FIGS. 1 and 3.

First description is made referring to FIG. 3 showing a flow of cold air in the horizontal direction at the cooling coil 7 portion. As partially shown at the cooling coil 7, cooling fins 12 are formed at a cooling pipe 11 of the cooling coil 7. The cooling fins 12 are arrayed to form a certain clearance between the adjacent cooling fins in the horizontal direction. As a result, cold air can flow in the fore-and-aft or up-and-down direction in the cooling coil 7.

The cooling fan 8a is set to rotate in a direction to discharge air behind the fan forward; therefore cold air of the cooling coil 7 behind the cooling fan 8a is sucked to the cooling fan 8a (an arrow 'a') and discharged into the freezer (an arrow 'b').

Air returning from the freezing chamber is fed to the cooling coil 7 behind the cooling fan 8a. Specifically, the cold air in the freezing chamber is sucked from a front area of the cooling coil 7 where the cooling fan 8a is not arranged (section A) (arrows 'c'), passed through a clearance 13 between the rear of the cooling coil 7 and the rear wall (arrows 'd'), and then fed to the cooling coil 7 behind the cooling coil 8a. Specifically, the clearance 13 serves as an air course to introduce the sucked cold air to the rear of the cooling fan 8a.

When the clearance 13 is excessively small, sufficient volume of cold air cannot be sucked. However, when it is excessively large, the cold air will diffuse in the clearance 13 and cannot be adequately introduced to the rear of the cooling fan 8a. The clearance 13 ranges are preferably between 20 to 50 mm. The air sucked by section A in this manner passes inside the cooling coil 7 in order to be cooled again and discharged into the freezing chamber (arrows 'b').

As mentioned above, a part of the air returning in front of the cooling coil 7 passes through the cooling coil 7. Most of the returning air will not enter the inside of the cooling coil 7, but heads directly for the rear of the cooling fan 8a (arrows 'e') and is discharged again into the freezing chamber (arrows 'b'). This occurs since suction force to directly head for the rear of the cooling fan 8a as indicated by arrows 'e' is strong while suction force at section A not occupied by the cooling fan 8a is weak.

Section A has less suction force because section A is not subject to a direct influence of the suction force of the cooling fan 8a, and the suction force of the cooling fan 8a is divided into several areas including section A.

In other words, returning air should pass a predetermined air course (a clearance between the cooling fins 12 and also the clearance 13) to flow into the rear of the cooling fan 8a via the cooling coil 7. As a result, the suction force is diffused in a wide range including not only section A at the side of the cooling fan 8a but section B at the lower part of the cooling fan 8a (FIG. 1).

The following explanation is about a flow of cold air in the freezing chamber. Cold air discharged from the cooling fan 8a toward a door 5 changes its direction as indicated by the arrows in FIG. 3 due to flange parts 14 of trays 9, flows to the wall 15a of the freezing chamber, and further to the cooling coil 7.

The discharged cold air flows to the wall 15a since cold air is discharged from the cooling fan 8a at the wall 15b while the counterflow is weak at the wall 15a not occupied by a cooling fan.

The cold air returning to the front of the cooling coil 7 is divided into an air heading directly for the rear of the cooling fan 8a and an air sucked into the cooling coil 7. As mentioned above, however, most of the returning air directly heads for the rear of the cooling fan 8a which has a strong suction force.

The cooling fan 8a is set to rotate in a direction to discharge cold air behind the fan toward the freezing chamber. Therefore, a discharged airflow from the cooling fan 8a is a confluence of air discharged through the inside of the cooling coil 7 and air discharged after directly heading for the rear of the cooling fan 8a.

The cold air is cooled by heat exchange with the cooling coil 7 just after it is discharged through the inside of the cooling coil 7, while the air directly heading for the rear of the cooling fan 8a is heated due to circulation in the freezer and also includes vapor generated from food.

That is, these two kinds of discharged cold airs are different in temperature, and these discharged cold airs exchange heat by their confluence in the freezer. As a result of this heat exchange, the cold air directly heading for the rear of the fan from the freezer will be cooled with the cold air that is sucked directly from the cooling coil 7, and a certain volume of vapor will solidify in the freezing chamber.

When the flow speed slows down, time for heat exchange between the discharged cold airs is prolonged, and thus, more vapor solidifies before the airflow returns to the front of the cooling coil 7. For example, in this embodiment, the flow discharged from the cooling fan 8a is diffused onto the respective trays 9 and the flow speed is reduced.

As mentioned above, suction force is weaker in the areas not occupied by the cooling fan 8a of the cooling coil 7 when compared to a suction force to suck air directly into the rear of the cooling fan 8a. As a result, the speed of the sucked airflow to the areas without the cooling fan 8a of the cooling coil 7 becomes slower than that of the airflow sucked directly to the rear of the cooling coil 7, and most of the vapor in the returning cold air can solidify before making contact with the surface of the cooling coil 7.

Furthermore, as most of the cold air in the freezing chamber circulates in the freezing chamber without passing through the cooling coil 7, most of the vapor in the freezing chamber will solidify therein.

As mentioned above, cold air returning to the cooling coil 7 is smaller in volume than airflow sucked directly into the rear of the cooling fans 8a, and most of the vapor can be removed before returning to the cooling coil 7. As a result, much less frost will be deposited on the cooling coil 7 even if the returning cold air passes through the cooling coil 7.

The above explanation about the flow of cold air by the cooling fan 8a can be applied to a cold airflow by the cooling fan 8b. However, as the cooling fan 8b is arranged opposite to the cooling fan 8a when viewed in the lateral direction of the cooling coil 7, the direction of the cold airflow by the cooling fan 8b and that by the cooling fan 8a become left-right symmetric about the center line in the fore-and-aft direction of the freezing chamber.

Next, a flow of cold air in the vertical direction due to the cooling fan 8a at the cooling coil 7 will be described referring to FIG. 1. Inside the cooling coil 7, cold air can flow up and down in the clearance between the cooling fins. Therefore, at the cooling fan 8a side of the cooling coil 7, sucked air moves upward (arrows 'e') due to the suction force of the cooling fan 8a and sucked by the cooling fan 8a (arrows 'f').

Similarly, at the clearance 13 behind the cooling coil 7, sucked air moves upward (an arrow 'g'). Air in the freezing chamber is sucked by both the cooling fan 8a and 8b at the lower section B of the cooling coil 7 not occupied by the cooling fan 8a (arrows 'h'), but the air moves in the clearance 13 to the cooling fan 8b after entering the cooling coil 7 before being divided into two parts: one being sucked by the cooling fan 8b and the other moving upward and being sucked by the cooling fan 8a.

Similar to the airflow in the horizontal direction described referring to FIG. 3, most of the air returning from the freezing chamber to the cooling coil 7 does not enter the cooling coil 7 but directly heads for the rear of the cooling fan 8a (arrows 'i') and is discharged again to the freezing chamber (arrows 'j').

Suction force is weak at section B where no cooling fans are arranged when compared to suction force at the rear of the cooling fan 8a, and the returning cold air flows moderately. Similar to the case of section A in FIG. 1, air should pass a certain air course (a clearance between the cooling fins 12 and the clearance 13 behind the cooling coil 7) to flow to the rear of the cooling fan 8a via the cooling coil 7, while the air in the freezing chamber can be sucked directly into the rear of the cooling fan 8a, and this results in a strong suction force.

Similar to the case of a flow of cold air described referring to FIG. 3, cold air returning to the cooling coil 7 is smaller in volume than the flow sucked directly toward the rear of the cooling fan 8a, and most vapor can be removed before the flow returns to the cooling coil 7. Therefore, much less frost will be deposited on the cooling coil 7 even if the returning cold air passes through the cooling coil 7.

The above explanation is about the flow of sucked air at the cooling coil 7 part having the cooling fan 8a. A similar explanation can be applied to the flow of sucked air for the side having the cooling fan 8b, though the relative position will be reversed vertically.

In this embodiment, the cooling fans 8a and 8b are arranged to be horizontal with regard to the cooling coil 7. Alternatively, the cooling fans can be inclined with a certain angle to the cooling coil 7 as a cooling fan 16 indicated by a double-dot chain line in FIG. 3.

Since cold air from a cooling fan is discharged radially to a predetermined extent, a part of the discharged cold air strikes the wall 15b and flows along the wall 15b (arrows 'k1', 'k2'). For a further efficient cooling of food on the trays 9, the discharged cold air preferably flows on the trays 9. By inclining the cooling fan, the discharged cold air at the wall 15b side will flow straight on the trays 9 (an arrow 'm').

Since cold air at the wall 15a side is discharged spreading to the wall 15a side (an arrow 'n'), food in a broader range can be cooled on the trays 9. In this way, the food on the trays 9 can be cooled with further efficiency by inclining the cooling fan.

Two cooling fans are used in this case, but this embodiment will not be limited thereto. For example, the freezer can be divided vertically into two parts, and the upper and lower parts can be provided with two cooling fans respectively, i.e., four in total.

The cooling coil stands at the backside in this embodiment, but additional cooling coils can stands at both sides of the freezer.

As mentioned above, frost deposited on the cooling coil can be reduced significantly in a freezer of this embodiment, and frost that will affect the cooling performance can be prevented. In such a device, the cooling coil does not need heating by a defrosting heater in a steady state, i.e., in a cooling operation, temperature rise in the cooling chamber due to the heat of the heater will not occur, and the cooling performance can be improved.

Therefore, the cooling device in the present invention can be used preferably for a refrigerator, a freezer, a freezing device, a cooling device for an automatic vending machine, a cold storage, and a freezer car. Such a refrigerator and a freezer can be intended for home use while the cold storage includes, for example, a cool warehouse.

In an example, a freezer having seven trays in total was used to measure wind speed at every part, wherein the fans are arrayed as in the above-mentioned embodiment (two fans are disposed at upper and lower parts). The measuring points and the results are shown in the following Table 1. The measuring points F1, F2, C1, and C2 are shown in FIG. 2. The fan rotation cycle is determined to be 1700 rpm (for both fans) and the rotation direction is set to discharge the cold air into the freezing chamber.

TABLE 1

| | |
|---|---|
| F1 (front of an upper fan) | 5.7 m/mim. |
| F2 (front of a lower fan) | 4.6 m/mim. |
| C1 (front of a cooling coil beside an upper fan) | 3.3 m/mim. |
| C2 (front of a cooling coil beside a lower fan) | 2.1 m/mim. |
| T1 (center of a second tray) | 0.7–1.3 m/mim. |
| T2 (center of a fifth tray) | 0.7–2.0 m/mim. |
| T3 (center of a seventh tray) | 0.7–1.3 m/mim. |

At C1 and C2, the wind speed was in the direction that cold air is sucked into the cooling device.

At a cooling operation with all the trays containing hot water of about 80° C., the pipe of the cooling coil was covered partially with frost, while the other parts had no frost when the water froze up.

The measuring results show that the wind speed on the trays and the areas not being occupied by a fan in this example is sufficiently moderate to solidify vapor in the freezing chamber before the air reaches the surface of the cooling coil.

Second Embodiment

Figure 4:
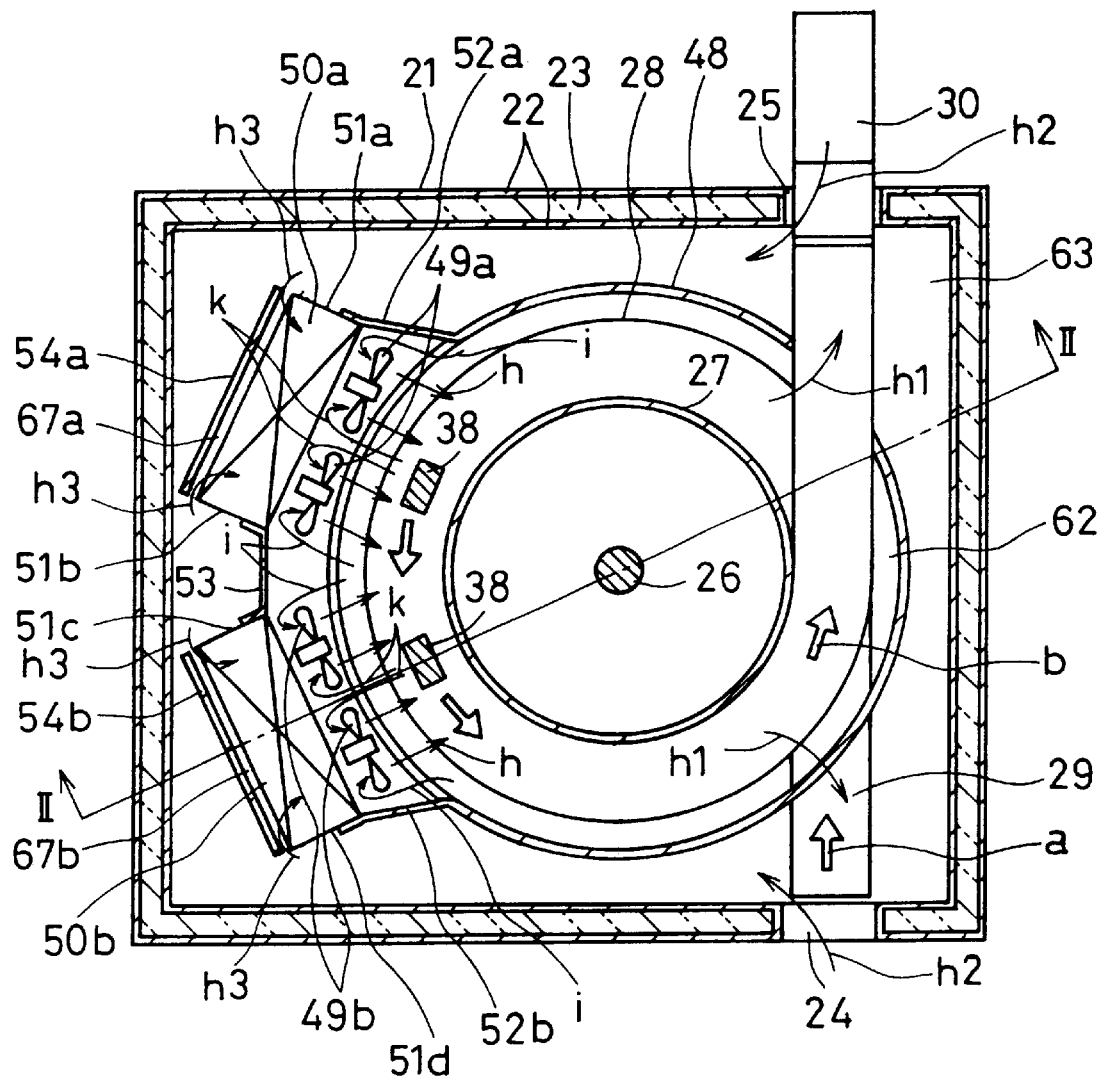
FIG. 4 is a cross-sectional view in the horizontal direction of a cooling device in a First Embodiment of the present invention.

FIG. 4 shows a cross section in the horizontal direction of a cooling device according to a Second Embodiment. The cooling device in this Second Embodiment relates to a spiral freezer to freeze food on a belt moving spirally in a thermal insulating box. As in conventional techniques, in a drum case 48 inside a thermal insulating box 21, a rotating drum 27 having a belt-driving plate 28 attached spirally on the outer periphery is disposed. The drum case 48 divides the thermal insulating box 21 into a cooling space 62 and an inner wall side space 63. The drum case 48 is made of, for example, a stainless steel plate.

A process for conveying food is similar to a conventional one. A foodstuff that is delivered from the food inlet 24 moves to an upper step of the belt-driving plate 28 by the move of the belt 29 (in the direction indicated by an arrow 'a') due to the rotation of the rotating drum 27. The food reaching the top of the belt-driving plate 28 further moves in a direction indicated by an arrow 'b' to a food outlet 25, and delivered out of the device by a food delivery belt 30. In this process, the food will be cooled while it is transferred upward.

Cooling fans 49a and 49b are arranged in front of cooling coils 50a and 50b, and the same fans are adjacent to the belt 29 combined with the belt-driving plate 28. Side plates 52a and 52b are attached respectively between a side plate 51a of the cooling coil 50a and the drum case 48, and also between a side plate 51d of the cooling coil 50b and the drum case 48.

Also, a side plate 53 is attached between a side plate 51b of the cooling coil 50a and a side plate 51c of the cooling coil 50b. Moreover, rear plates 54a and 54b are positioned respectively adjacent to the rears of the cooling coils 50a and 50b.

Since the side plates 51a–51d are formed integrally with the cooling coils, detailed illustration thereof is omitted. The side plates 52a, 52b and 53 can be formed by processing the drum case 48, or a separate plate other than the drum case 48 can be jointed.

Figure 5:
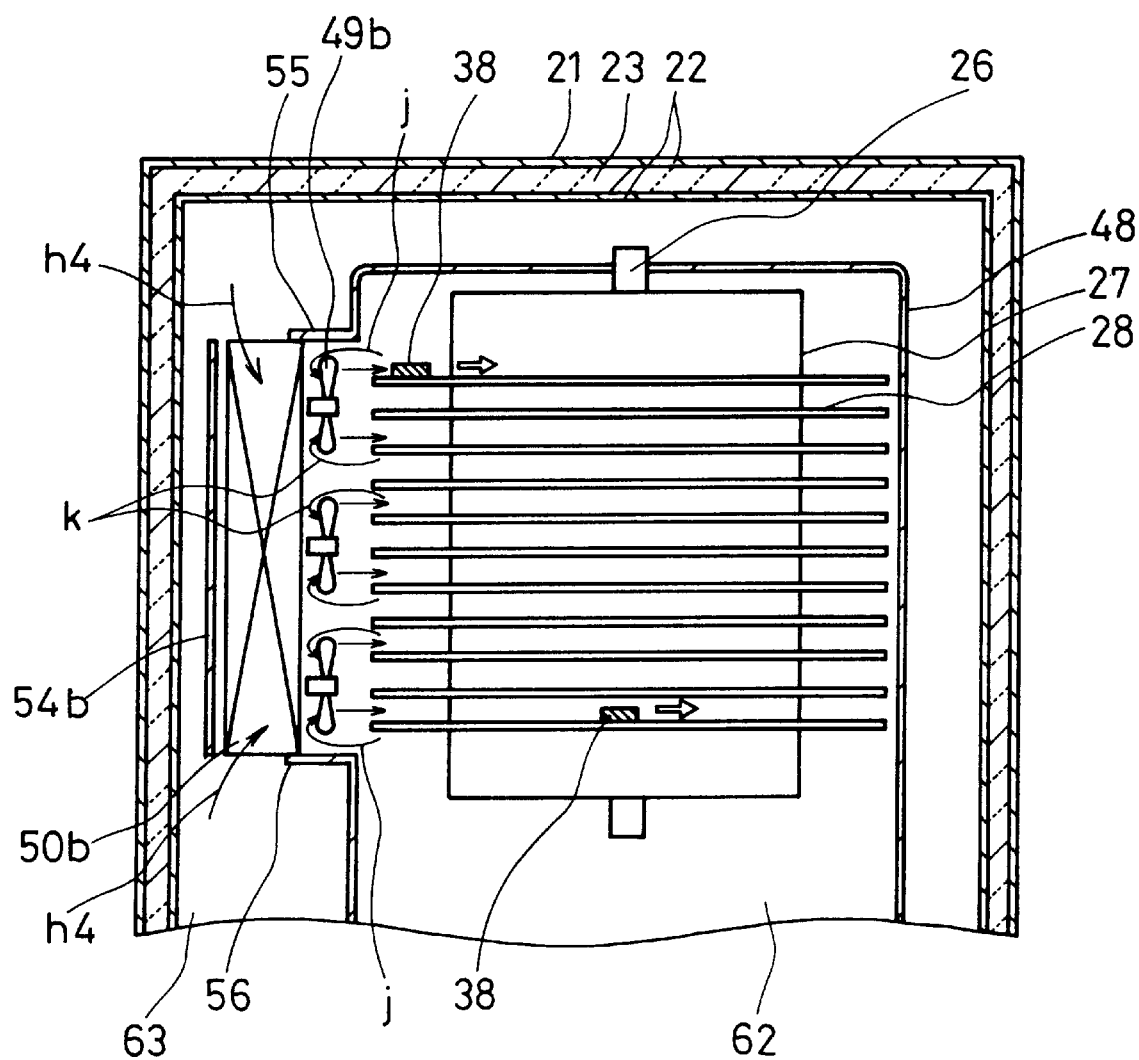
FIG. 5 is a cross-sectional view taken along a line II—II in FIG. 4.
Figure 12:
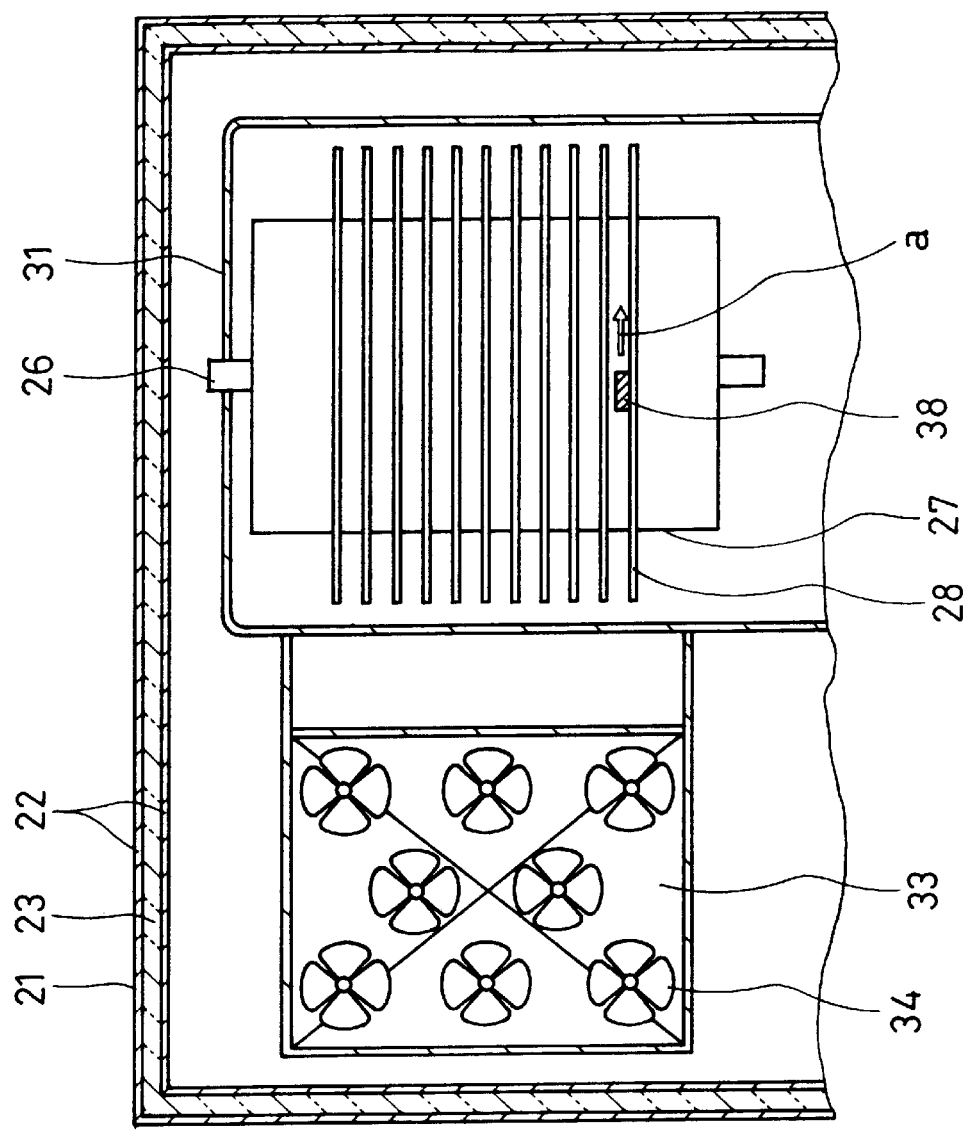
FIG. 12 is a cross-sectional view in the vertical direction of the spiral freezer of FIG. 11.
Figure 13:
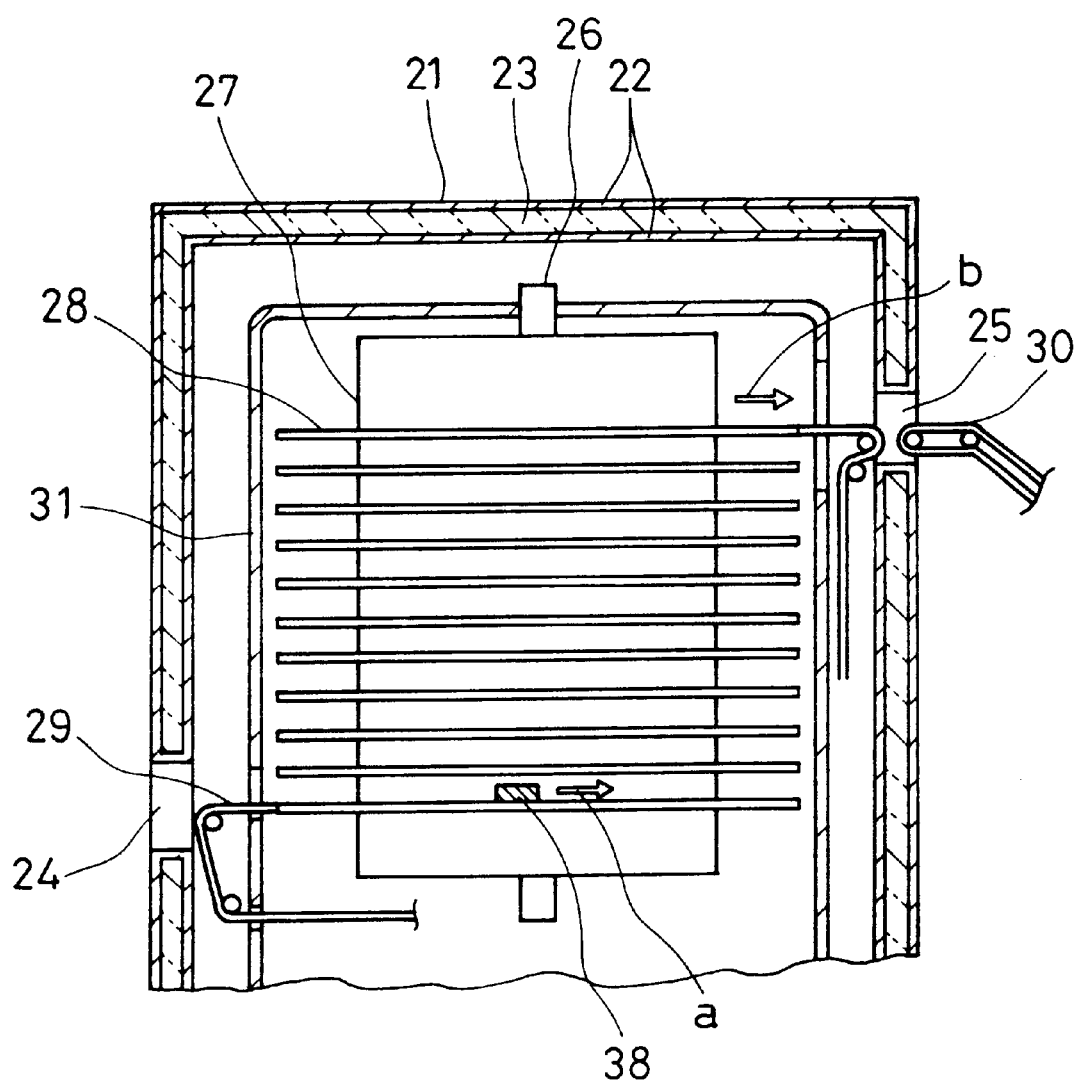
FIG. 13 is a cross-sectional view taken along a line I—I in FIG. 11.

FIG. 5 is a cross-sectional view taken along a line II—II of FIG 4. Similar to FIGS. 12 and 13, a column to which the drum 48 for conveying food and also a driving motor are omitted from FIG. 5. A top plate 55 is formed on the cooling coil 50b and a base plate 56 under the same coil. The cooling coil 50a is configured similarly. The top plate 55 and the base plate 56 are shown as being integrated with the drum case 48, but isolated top plate 55 and base plate 56 can be joined with the drum case 48.

Similar to conventional techniques, the cooling coil 50b is positioned at a height substantially equal to the height from the bottom to the top steps of the belt-driving plate 28, and a plurality of cooling fans 49b are arranged on substantially the entire surface of the cooling coil 50b in order to provide cold air evenly to the belt-driving plate 28 from the bottom to the top thereof (FIG. 5). A similar structure is selected for the cooling coil 50a.

The cooling fans 49a and 49b are set to rotate in a direction to discharge air behind the cooling fans directly forward. Accordingly, air in the inner wall side space 63 is sucked to the rear of the cooling fans 49a. and 49b and discharged into the cooling space 62.

In other words, air in the inner wall side space 63 enters inside the respective cooling coils 50a and 50b through clearances 67a and 67b provided between the rear of the coils and. the inner walls of the rear plates (54a, 54b) as indicated by arrows 'h3' in FIG. 4. The air is cooled while passing through the cooling coil and discharged into the cooling space 62. Similarly, as indicated by arrows 'h4' in FIG. 5, the air in the inner wall side space 63 enters inside the cooling coils 50a, 50b from the upper and bottom surface of the respective coils. The air is cooled while passing through the cooling coils and discharged into the cooling space 62.

A flow of cold air between the cooling space 62 and the cooling coils 50a and 50b are described specifically. Since flows of cold air at the cooling coil 50a and the cooling coil 50b are similar to each other, the cooling coil 50b are exemplified in the following description. Similar to the cooling coil 7 shown in FIG. 3, the cooling coil 50b has a cooling pipe at which cooling fins are formed. Therefore, cold air can flow in a fore-and-aft or up-and-down direction in the cooling coil 50b.

Since the cooling fan 49b is set to rotate to discharge air behind the fan forward, the air in the cooling coil 50b behind the cooling fan 49b is sucked into the cooling fan 49b and discharged into the cooling space 62 (arrows 'h').

Figure 6:
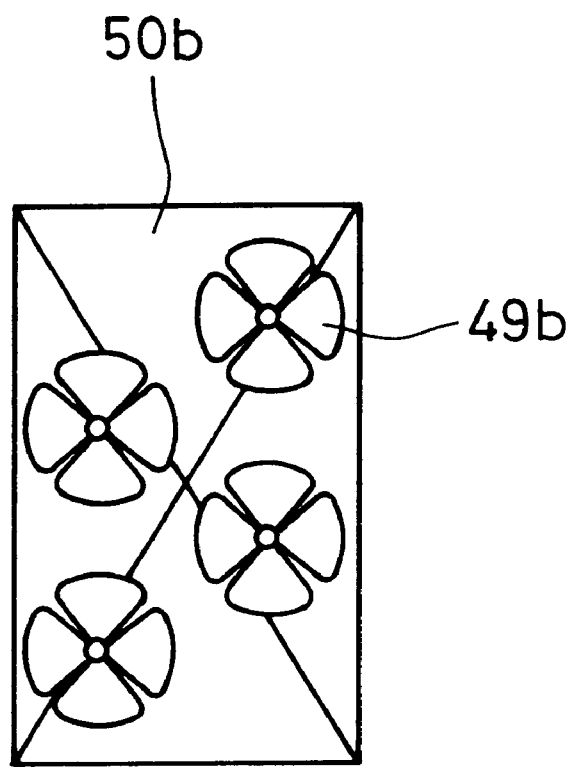
FIG. 6 is a front view of a cooling coil of a cooling device in the First Embodiment of the present invention.

Air returning from the cooling space 62 is fed to the cooling coil 50b behind the cooling fan 49b. Specifically, cold air in the cooling space 62 is sucked at areas in the front of the cooling coil 50b not occupied by the cooling fan 49b (see FIG. 6), and it passes through a clearance 67b between the rear of the cooling coil and the rear wall before being fed again to the cooling coil 50b behind the cooling fan 49b. That is, the clearance 67b serves as an air course to introduce sucked cold air to the rear of the cooling fan 49b.

When the clearance 67b is too small, sufficient volume of cold air cannot be sucked. Or when it is too large, cold air will diffuse in the clearance 67b and the cold air cannot be adequately introduced to the rear of the cooling fan 49b. So the clearance 67b is preferably from 20 to 50 mm.

Cold air sucked from the cooling space 62 side into the cooling coil 50b passes through the cooling coil 50b via the clearance 67b in order to be cooled again and discharged into the freezing chamber.

The above description is about a part of air returning in the front of the cooling coil 50b, which passes through the cooling coil 50b. Most of the returning air does not enter the cooling coil 50b but it heads for the rear of the cooling fan 49b (arrows 'i' and 'k') to be discharged again into the freezing chamber (arrows 'h'). The reason is that the suction force which allows the air to directly head for the rear of the cooling fan 49b is strong while the same force is weak at the part where the cooling fan 49b is not arranged.

This weak suction force can be explained as follows. The suction force of the cooling fan 49b does not have a direct influence on areas that are not occupied by the cooling fan 49b. Furthermore, the suction force of the cooling fan 49b via the cooling coil 50b is diffused to a large extent.

In other words, returning air should pass a predetermined air course (a clearance between the cooling fins and the clearance 67b) to flow into the rear of the cooling fan 49b through the cooling coil 50b. As a result, the suction force is brought to not only the side of the cooling fan 49b but the lower part of the cooling fan 49b (see FIG. 6), and it is diffused to a large extent.

Most of the cold air discharged into the cooling space 62 is reflected by the outer wall of the drum 27 in order to return to the front of the cooling coil 50b (arrows 'i', 'k'). That is, the cold air returning to the front of the cooling coil 50b is divided into air heading directly for the rear of the cooling fan 49b and air sucked into the cooling coil 50b. As mentioned above, most of the returning air directly heads for the rear of the cooling fan 49b having a strong suction force.

The cooling fan 49b is set to rotate in a direction to discharge cold air behind the fan toward the freezing chamber. Therefore, a discharged airflow from the cooling fan 49b is a confluence of air discharged through the inside of the cooling coil 50b and air directly heading for the rear of the cooling fan 49b before being discharged.

The cold air is cooled by heat exchange with the cooling coil 50b just after it is discharged through the inside of the cooling coil 50b, while the air directly heading for the rear of the cooling fan 49b is heated due to circulation in the freezer and also includes vapor generated from food.

That is, these two kinds of discharged cold air are different in temperature, and these discharged cold airs exchange heat by the confluence in the freezer. As a result of this heat exchange, the cold air directly heading from the cooling space 62 for the rear of the fan will be cooled with the other cold air that is sucked directly by the cooling coil 50b, and a certain volume of vapor will also solidify in the freezing chamber.

When the flow speed slows down at this stage, time for heat exchange between the discharged cold airs is prolonged, and thus, more vapor solidify before returning to the front of the cooling coil 50b. For example, in this embodiment, the flow discharged from the cooling fan 49b is diffused onto the respective steps of the belt-driving plate 28 (see FIG. 5) and the flow speed is reduced.

As mentioned above, suction force is weaker in the areas not occupied by the cooling fan 49b of the cooling coil 50b when compared to a suction force to be sucked directly into the rear of the cooling fan 49b. As a result, the speed of the sucked airflow to the areas not occupied by the cooling fan 49b of the cooling coil 50b becomes slower than that of the airflow sucked directly to the rear of the cooling fan 49b, and most of the vapor in the returning cold air can solidify before contacting with the surface of the cooling coil 50b.

Furthermore, as most of the cold air in the cooling space 62 circulates in the cooling space 62 without passing through the cooling coil 50b, most of the vapor in the cooling space 62 will solidify therein.

As mentioned above, the cooling fan 49b rotates in a direction to discharge air at the cooling coil side to the front of the cooling fan. Therefore, air in the inner wall side space 63 is also sucked by the rear, top and bottom surfaces of the cooling coil 50b, and discharged into the cooling space 62 via the cooling fan 49b. Cold air in the cooling space 62 is fed to the inner wall side space 63 through a ventilating hole (arrow 'h1').

Namely, the inner wall side space 63 is chilled due to the flowing air, and the drum case of stainless steel is also cooled; the cold air in the inner wall side space 63 adjacent to the drum case is also cooled. As a result, the cold air in the inner wall side space 63 will flow while reducing its moisture content.

As mentioned above, cold air returning to the cooling coil 50b is smaller in volume than airflow sucked directly into the rear of the cooling fan 49b, and most of the vapor can be removed before the air returns to the cooling coil 50b. As a result, much less frost will be deposited on the cooling coil 50b even if the returning cold air passes through the cooling coil 50b.

Since the respective cooling fans are arranged in front of the cooling coil and any special air courses to introduce cold air are not disposed in front of the respective cooling fans, the cold air will be discharged with a certain expanse to the fan diameter. As a result, a device having multiple cooling fans as mentioned in this embodiment is preferably used for rapid cooling since cold airs discharged from respective fans overlap.

Moreover, since the cooling fans 49a and 49b are adjacent to the belt 29, the cold air from the cooling fans can be discharged directly to the food 38. This is also preferred for rapid cooling.

When a plurality of cooling fans are arranged in front of the cooling coil, the cooling fans are attached respectively with an inclination to the cooling coil so that the cold airs discharged from the respective cooling fans intersect each other. As a result, cold airs will be concentrated on the food, and this is more advantageous in view of rapid cooling.

Unlike conventional techniques, this embodiment does not require any special spaces as an air course for circulation of returning air. Moreover, since the cooling fans 49a and 49b are adjacent to the belt 29 combined with the belt-driving plate 28, cold airs from the cooling fans 49a, 49b are discharged directly into the drum case 48. Therefore, unlike the conventional techniques, a space as an air course for circulating cold air is not required.

Therefore, a spiral freezer as exemplified in this embodiment requires little space for the cooling unit part to extend to the drum case 48, and space can be saved.

Two cooling coils are used in the example of FIG. 4, but the number can be decreased to one or increased to three or more, corresponding to the required cooling performance. Cooling coils can be increased sequentially by arraying along the outer periphery of the belt-driving plate 28. Since the outer-peripheral space of the belt-driving plate 28 can be used efficiently while controlling the cooling coil from extending longitudinally in this array, the space for arranging will not be increased significantly even if the number of the cooling coils are increased to a certain limit.

Namely, the space for disposition will not be excessively increased even if the number of the cooling units is increased. Therefore, performance in rapid cooling also can be improved with saved space.

The cooling device of this embodiment can be used, for example, in freezing sliced fish from 5° C. to −5° C. Or the same device can be used to cool, for example, fresh bread of about 80° C. to about 10–20° C. Temperatures of food at the outlet can be adjusted by adjusting the rotation speed of the rotating drum.

In particular, remarkable effects in decreasing frost on a cooling coil are available for freezing. Namely, as mentioned above, a cooling device of this embodiment that can blow cold air from the cooling fans directly over food allows rapid cooling, and a thin ice film (ice barrier) will be formed on the food in a short time.

The cooling space will reach its saturated vapor pressure quickly due to moisture of the food evaporated before formation of the ice barrier. Therefore, evaporation of moisture from the food is prevented at the initial stage of cooling, and dry air will circulate in the cooling space, and thus, substantially no frost will be deposited on the cooling coil.

Figure 7:
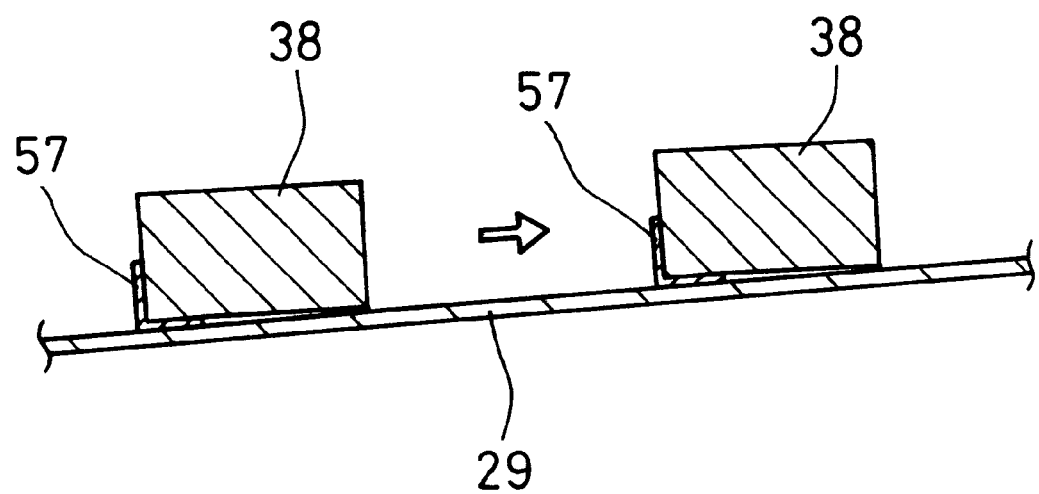
FIG. 7 is a cross-sectional view showing one embodiment of a stopper system of a cooling device in the present invention.

Since the belt 29 moves spirally on a inclined surface, food placed on the belt 29 will slide easily when the belt is frozen. As shown in FIG. 7, stoppers 57 are provided to the surface of the belt 29 in order to prevent the food 38 from sliding off.

Third Embodiment

Figure 8:
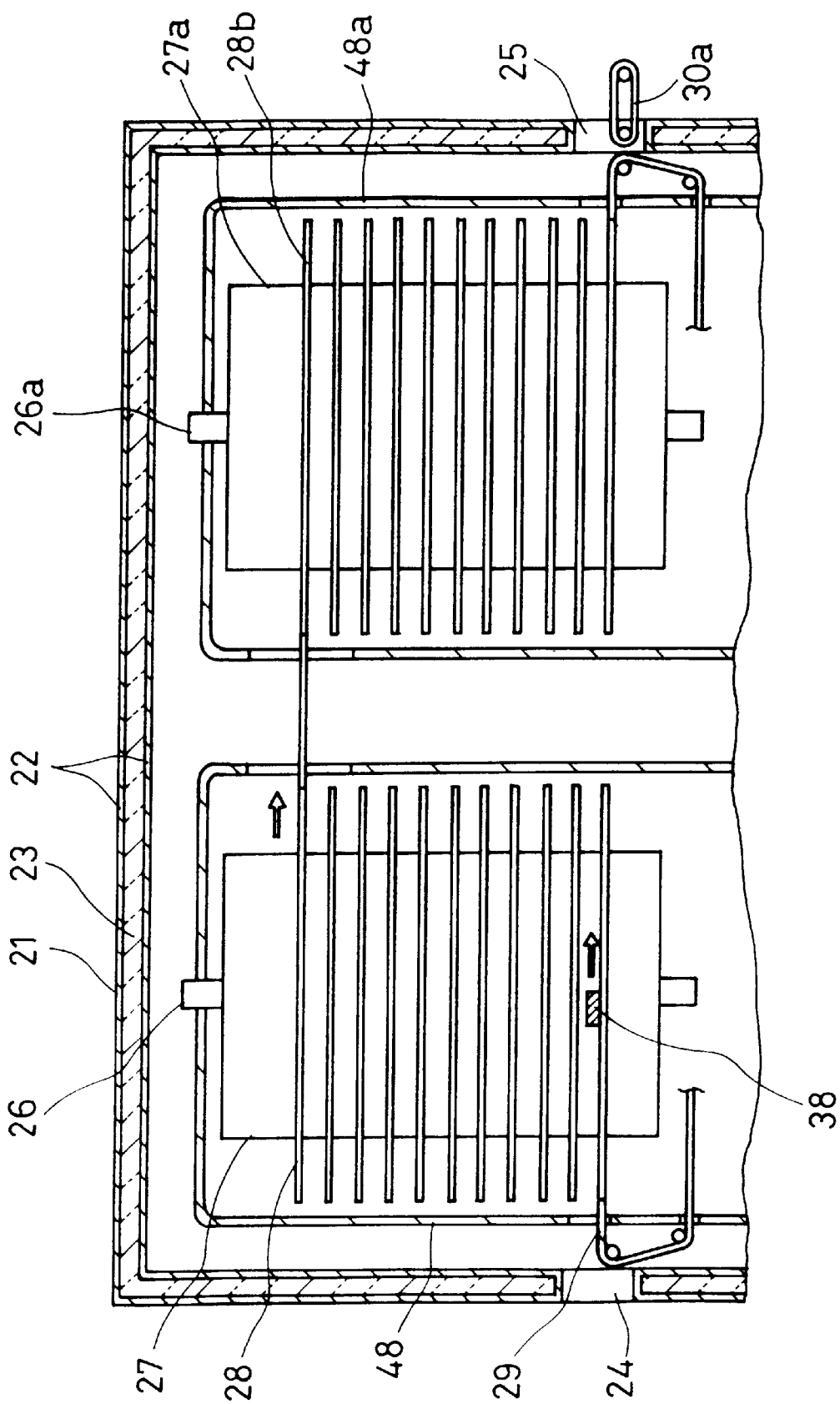
FIG. 8 is a cross-sectional view in the longitudinal direction of a cooling device in a Second Embodiment of the present invention.

FIG. 8 is a vertical cross-sectional view in the longitudinal direction of a cooling device according to a Third Embodiment. The Third Embodiment relates to a spiral freezer. For clearly indicating the conveyance of food, a cross section above the center line of a rotating drum is overlapped with those of a food inlet 24 and also of a food outlet 25.

Two rotating drums are used in the spiral freezer of the Third Embodiment, where a rotating drum 27a is included additionally in the freezer of the Second Embodiment. Similar to the Second Embodiment, the rotating drum 27a is housed in a drum case 48a, and it rotates about the shaft 26 in a direction identical to the rotating drum 27.

A belt-driving plate 28b is attached spirally to the rotating drum 27a. A belt 29 is mounted on the belt-driving plates 28, 28b. The belt 29 is bridged between the top step of the belt-driving plate 28 and that of the adjacent belt-driving plate 28b. The belt-driving plate 28 spirals in the same direction as in the First Embodiment, while the belt-driving plate 28b spirals in a reverse direction to the belt-driving plate 28.

As a result, the belt on the belt-driving plate 28 moves upward from the lower step of the belt-driving plate 28 when the rotating drums 27 and 27a rotate in the same direction, while the belt 29 on the belt-driving plate 28b moves downward from the upper step of the belt-driving plate 28b. Similar to the rotating drum 27, a cooling coil and a cooling fan are provided to the rotating drum 27a, but they are not shown in FIG. 8.

In this configuration, a foodstuff 38 that is placed on the belt 29 at the food inlet 24 moves upward from the lower step of the belt-driving plate 28 due to the rotation of the rotating drum 27. After reaching the top step, the foodstuff moves to the top of the belt-driving plate 28b. As mentioned above, the foodstuff 38 moves from the upper step of the belt-driving plate 28b downward at the rotating drum 27b part. When the foodstuff 38 reaches the bottom step of the belt-driving plate 28b, it is delivered outward with the food delivery belt 30a.

The spiral freezer in the Second Embodiment can provide a higher cooling performance when compared to a freezer having a single rotating drum. That is, the foodstuff 38 is cooled continuously while moving on the rotating drums 27 and 27a. It is advantageous when every foodstuff is big or the temperature of the entering food is high.

Since the foodstuff 38 is lifted in the device by one of the rotating drums and descends by the other rotating drum, the food inlet 24 and the food outlet 25 can be set at substantially the same height. As a result, this device does not need an outer belt to descend the lifted foodstuff 38, and thus, the equipment can be simplified outside the device.

Fourth Embodiment

Figure 9:
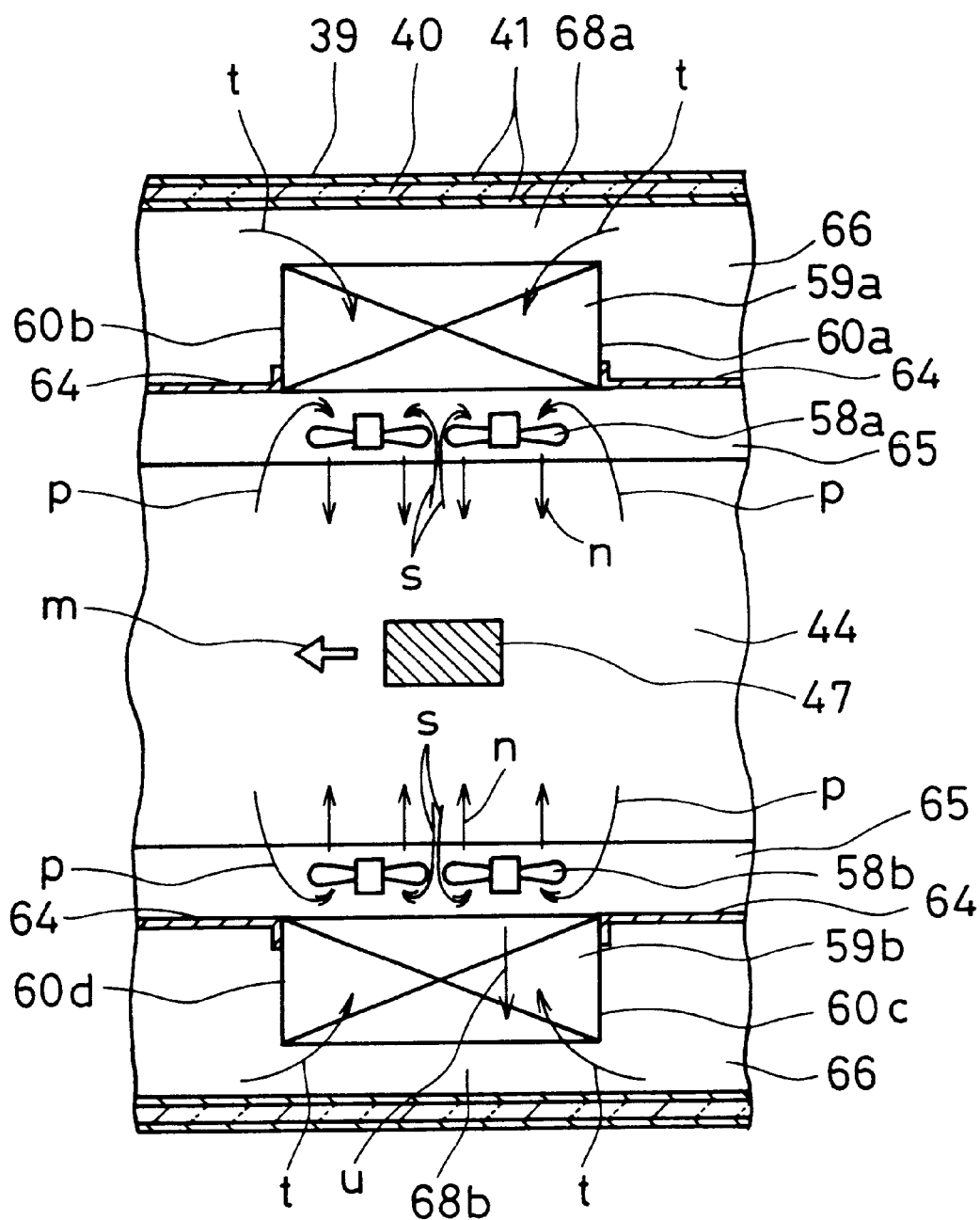
FIG. 9 is a cross-sectional view in the horizontal direction of a cooling device in a Third Embodiment of the present invention.
Figure 10:
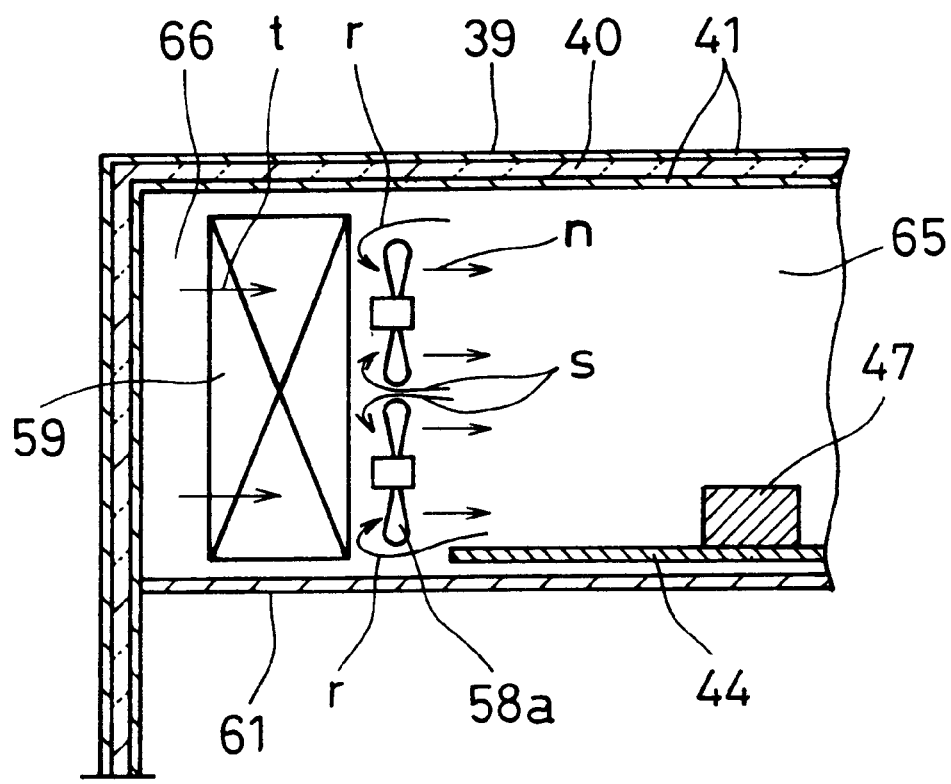
FIG. 10 is a cross-sectional view in the vertical direction of the cooling device of FIG. 9.
Figure 11:
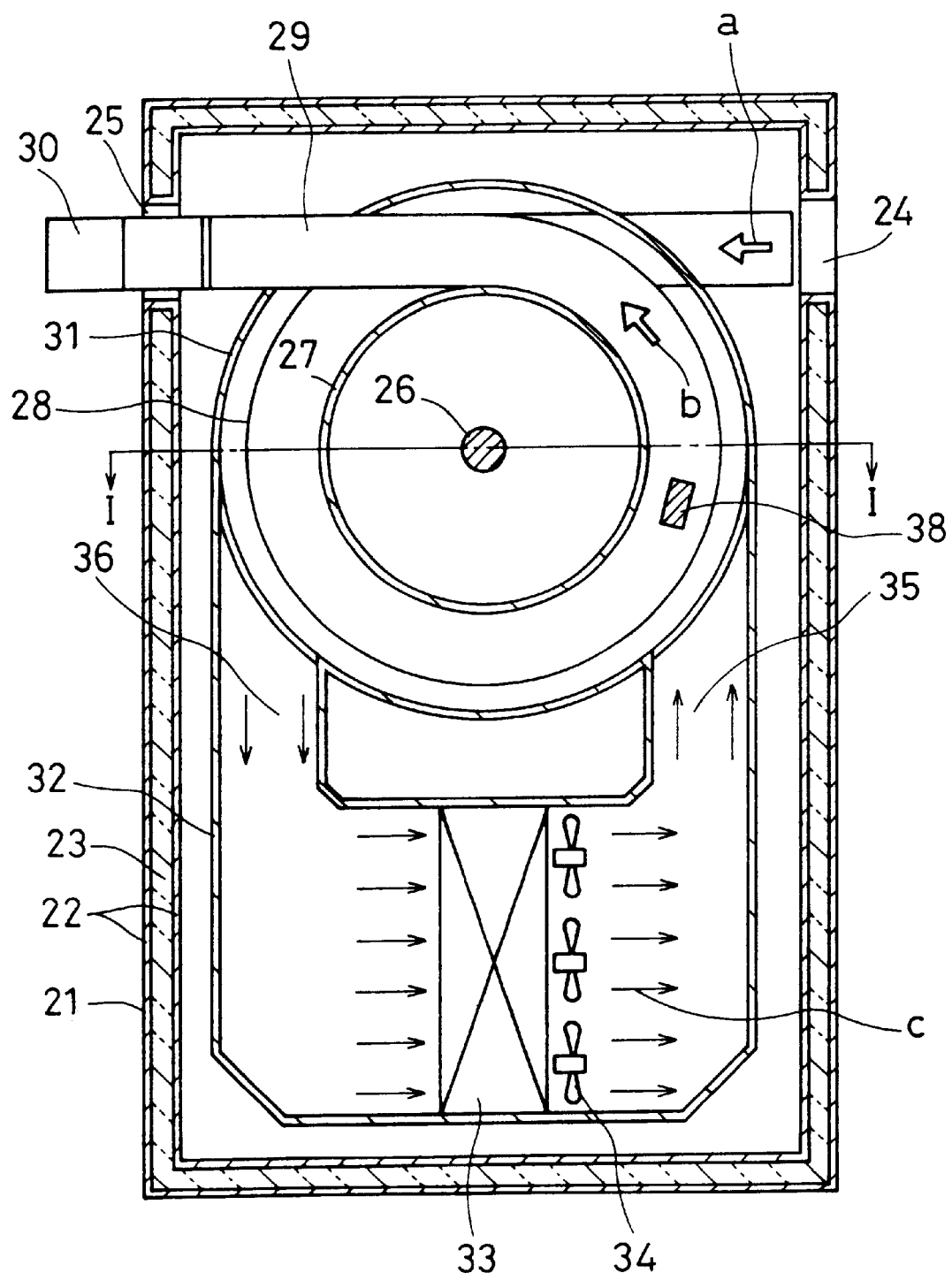
FIG. 11 is a cross-sectional view in the horizontal direction of a conventional spiral freezer.

FIG. 9 shows a cross section in the horizontal direction of a cooling device in a Fourth Embodiment. This embodiment relates to a tunnel freezer to freeze food on a belt moving horizontally in a thermal insulating box. FIG. 10 shows a cross section in the vertical direction of the same tunnel freezer of FIG. 9.

Figure 14:
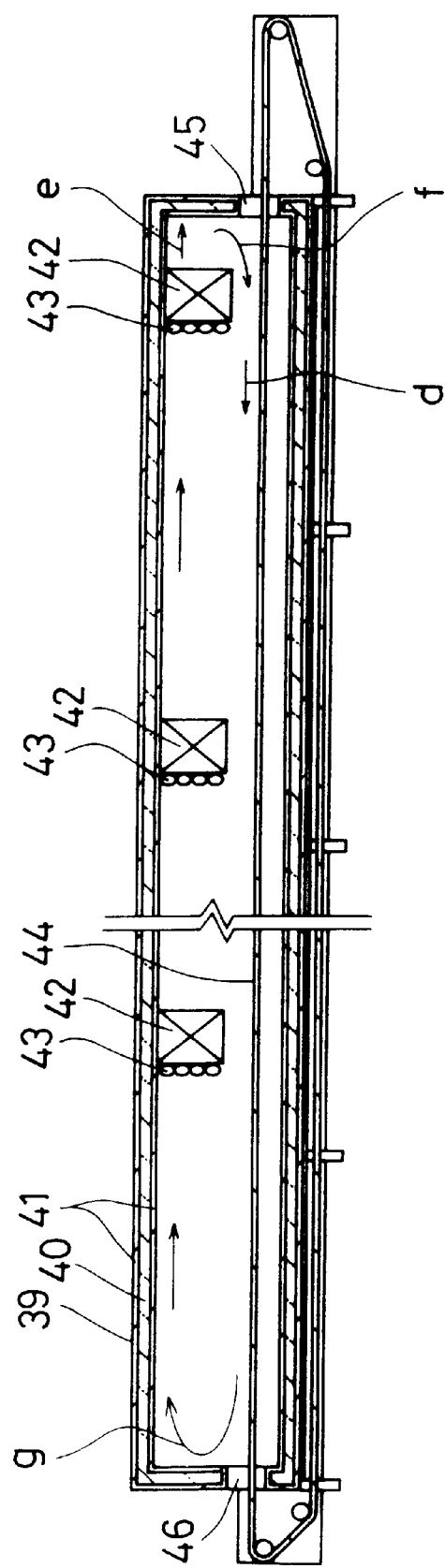
FIG. 14 is a vertical cross-sectional view in the longitudinal direction of a conventional tunnel freezer.

Similar to conventional devices, a foodstuff 47 is conveyed by a belt 44 moving in a direction indicated by an arrow 'm' in a thermal insulating box 39. Similar to a conventional device shown in FIG. 14, sections corresponding to the food inlet 45 and the food outlet 46 are provided at the both ends in the longitudinal direction of the thermal insulating box 38, though they are not shown in FIGS. 9 and 10 as partial views.

Cooling fans 58a and 58b are adjacent to the belt 44, and arranged respectively in front of the cooling coils 59a and 59b. The cooling coils 59a and 59b are positioned so that their rear, top, and bottom surfaces are adjacent to the inner walls of the thermal insulating box 39 or the like (FIG. 10).

The thermal insulating box 39 is divided with a partition 64 into a cooling space 65 and an inner wall side space 66. The partition 64 is made of a stainless steel plate or the like. Clearances to flow the air in the cooling space 65 to the inner wall side space 66 are formed between the upper end face of the partition 64 and the top plate of the thermal insulating box 39, and between the lower end face of the partition 64 and a plate 61 for an attachment of a cooling coil (FIG. 10). Preferable ranges of the clearances above and below the partition 64 are from 20 to 50 mm respectively. Front parts of the respective side plates (60a–60d) of the cooling coils 59a and 59b contact with the inner periphery of the opening part of the partition 64, and the respective cooling coils are arranged closer to the inner wall side space 66.

In this embodiment, the cooling fans 58a and 58b face each other with the belt 44 between them. Both the cooling fans 58a and 58b are set to rotate so that the air behind the cooling fans is discharged directly to the belt 44 (a direction indicated by arrows 'n').

This embodiment shows an example which uses two cooling fans for a cooling coil. Similar to the array shown in FIG. 2, one of the cooling fans is arranged at the upper-half of the cooling coil while the other is at the lower-half thereof so that the centers of these cooling fans are positioned on the same diagonal line of the cooling coil.

Cold airs discharged from the opposing cooling fans 58a and 58b collide with each other above the belt 44. In this way, the foodstuff 47 moving along with the belt 44 is cooled with the cold air discharged from these fans.

In FIG. 9, only a pair of cooling units facing each other are shown, but plural pairs of cooling units are arranged in the longitudinal direction of the belt 44. Therefore, the foodstuff 47 is cooled sequentially as it proceeds in the direction indicated by an arrow 'm', and the foodstuff 47 is completely frozen by the time it reaches the food outlet.

Hereinafter, flow of the cold air between the cooling space 65 and the cooling coils 59a, 59b is described specifically. The cooling coil 59b is exemplified since the airflow at the cooling coil 59a side is similar to that of the cooling coil 59b. Similar to the cooling coil 7 shown in FIG. 3, the cooling coil 59b has a cooling pipe provided with cooling fins. Therefore, in the cooling coil 59b, cold air can flow in the fore-and-aft direction (from the cooling space 65 to the inner wall side space 66 and vice versa) or in the up-and-down direction (the direction that the cooling coils stands).

The cooling fan 58b is set to rotate so that the air behind the fan is discharged forward. Therefore, the cold air of the cooling coil 59b behind the cooling fan 58b is sucked by the cooling fan 58b (arrows 't') and discharged into the cooling space 65 (arrows 'n').

Air returning from the cooling space 65 is fed to the cooling coil 59b behind the cooling fan 58b. Specifically, the cold air of the cooling space 65 is sucked (an arrow 'u') at an area of the front of the cooling coil 59b not occupied by the cooling fan 58b (corresponding to section C1 of FIG. 2), and fed to the cooling coil 59b behind the cooling fan 58b via the clearance 68b between the rear of the cooling coil and the rear wall. That is, the clearance 68b serves as an air course to introduce sucked air to the rear of the cooling fan 58b.

When the clearance 68b is too small, a sufficient volume of cold air cannot be sucked. Or when it is too large, the cold air will diffuse in the clearance 68b, and it is prevented from being introduced to the rear of the cooling fan 58b. Therefore, the clearance 68b ranges preferably from 20 to 50 mm.

In this way, cold air sucked from the cooling space 65 side into the cooling coil 59b passes through the cooling coil 59b in order to be cooled again and discharged into the freezing chamber.

The above description is about a part of air returning in the front of the cooling coil 59b, which passes through the cooling coil 59b. Most of the returning air does not enter the cooling coil 59b but it heads for the rear of the cooling fan 58b (arrows 'p', 's' and 'r') to be discharged again into the cooling space 65 (arrows 'n'). The reason is that the suction force to allow the air to directly head for the rear of the cooling fan 58b is strong while the same force is weak at the areas not occupied by the cooling fan 58b.

This weak suction force can be explained as follows. The suction force of the cooling fan 58b does not have a direct influence on areas that are not occupied by the same fan 58b. Furthermore, the suction force of the cooling fan 58b via the cooling coil 59b is diffused to a large extent.

In other words, returning air should pass a predetermined air course (a clearance between the cooling fins and the clearance 68b behind the cooling coil) to flow into the rear of the cooling fan 58b via the cooling coil 59b. As a result, the suction force is brought to not only to the side of the cooling fan 58b but the upper and lower parts of the cooling fan 58b (FIG. 2) also, and it is diffused to a large extent.

Most of the cold air discharged from the respective cooling fans 58a, 58b to the cooling space 65 collide with cold air discharged from opposite cooling fans above the belt 44 Since the cooling fans 58a and 58b have suction force to suck air into the rear of the fans, the cold air above the belt 44 is sucked by the cooling coils (59a, 59b) side. The cold air returning to the front of the cooling coil 59b is divided into air heading directly for the rear of the cooling fan 58b and air sucked into the cooling coil 59b. As mentioned above, most of the returning air directly heads for the rear of the cooling fan 58b having a strong suction force.

The cooling fan 58b is set to rotate in a direction to discharge cold air behind the fan toward the cooling space 65. Therefore, an airflow discharged from the cooling fan 58b is a confluence of air discharged through the inside of the cooling coil 59b and air discharged after directly heading for the rear of the cooling fan 58b.

The cold air is cooled by heat exchange with the cooling coil 59b just after it is discharged through the inside of the cooling coil 59b, while the air directly heading for the rear of the cooling fan 58b to be discharged is heated due to circulation in the freezer and also includes vapor generated from food.

That is, these two kinds of discharged cold airs are different in temperature, and these discharged cold airs exchange heat by the confluence in the freezer. As a result of this heat exchange, the cold air discharged again into the freezing chamber with raised temperature is cooled with the other cold air that is sucked directly by the cooling coil 59b, and a certain volume of vapor also solidifies in the cooling space 65.

When the flow speed slows down at this stage, time for heat exchange between the discharged cold airs is prolonged, and thus, more vapor solidify before the airflow returns to the front of the cooling coil 59b. For example, in this embodiment, most of the cold air discharged from the respective cooling fans 58a, 58b into the cooling space 65 collide with cold air discharged from the opposing cooling fans above the belt 44, and thus, the flow speed of the air from the respective cooling fans is reduced.

As mentioned above, suction force is weaker in the areas not occupied by the cooling fan 58b of the cooling coil 59b when compared to a suction force to suck air directly into the rear of the cooling fan 58b. As a result, the speed of the sucked airflow to the areas not occupied by the cooling fan 58b of the cooling coil 59b becomes slower than that of the airflow sucked directly to the rear of the cooling fan 58b, and most of the vapor in the returning cold air can solidify before making contact with the surface of the cooling coil 59b.

Furthermore, as most of the cold air in the cooling space 65 circulates in the cooling space 65 without passing through the cooling coil 59b, most of the vapor in the cooling space 65 will solidify therein.

Cold air discharged onto the belt 44 is partially reflected by the opposing partition 64 and returns. Most of the cold air returned to the front of the partition 64 strikes the partition 64, and moves along the partition 64 to the upper and lower clearances. The air passes through the upper and lower clearances of the partition 64 and flows into the inner wall side space 66, entering again the respective cooling coils, being cooled while passing through the cooling coils and discharged again into the cooling space 65.

In other words, the inner wall side space 66 is chilled due to the flow of the cold air. Furthermore, when the inside of the cooling space 65 is cooled, partition 64 of a stainless steel or the like is also cooled, and so is the inner wall side space 66 adjacent to the partition. Therefore, the air flowing into the inner wall side space 66 will flow in the inner wall side space 66 while reducing its moisture content.

As a result, air sucked from the inner wall side space 66 into the cooling coil will be cooled further while it is passing through the cooling coil. However, as the moisture content has been lowered, frost deposited on the cooling coil is reduced extremely.

Furthermore, since the cooling fans are arranged respectively in front of the cooling coil and any special air courses to introduce discharged cold air are not disposed in front of the respective cooling fans, the discharged cold air will be blasted with a certain extent to the fan diameter. As a result, when the freezer comprises a plurality of cooling fans as in this embodiment, cold airs discharged from the respective cooling fans are also overlapped, and it enables rapid cooling.

Furthermore, as the cooling fans 58a and 58b are adjacent to the belt 44 in this embodiment, cold air from the cooling fans is discharged directly to the foodstuff 38. Therefore, it is used preferably for rapid cooling.

When a plurality of cooling fans are arranged in front of the cooling coil, the respective cooling fans are attached with an inclination to the cooling coil so that the cold airs discharged from the respective cooling fans intersect each other. As a result, cold airs will be concentrated on the food, and this is more advantageous in view of rapid cooling.

In a conventional device in which cooling units are aligned, the device is extended in a longitudinal direction as the number of pairs of cooling units is increased. On the other hand, in a device of this embodiment, cooling units can be arranged oppositely, so the device will be less extended in the longitudinal direction when compared to a conventional device if the numbers of the cooling units are the same. Therefore, the device will not require extremely large space even if the numbers of the cooling units are increased. As a result, rapid cooling performance can be improved while saving space. Therefore, a tunnel freezer as shown in this embodiment is useful for rapid cooling.

The cooling device of this embodiment can be used, for example, in freezing noodles from 10° C. to −40° C. The same device can be used for cooling, for example, fresh bread of about 80° C. to about 10–20° C. Temperatures of food at the outlet can be adjusted by adjusting the traveling speed of the belt.

In particular, considerable effects in decreasing frost on a cooling coil are available for freezing. Namely, as mentioned above, a cooling device of this embodiment enables rapid cooling since it can blow cold air from the cooling fans directly on food and form a turbulent state, and a thin ice film (ice barrier) will be formed on the food in a short time. The cooling space will reach its saturated vapor pressure quickly due to moisture of the food evaporated before formation of the ice barrier. Therefore, evaporation of moisture from the food is prevented at the initial stage of cooling, and dry air will circulate in the cooling space, and thus, substantially no frost will be deposited on the cooling coil.

The cooling coils and cooling fans are arranged at both sides of the belt in this embodiment, but the coils and belts can be arranged only at one side thereof.

INDUSTRIAL APPLICABILITY

As mentioned above, a cooling device of the present invention and a cooling method using the same can significantly reduce frost deposited on a cooling coil, and can prevent frost on the cooling coil from affecting the cooling performance. Therefore, such a cooling device can be used for a refrigerator, a freezer, a refrigeration device, a refrigeration device for a automatic vending machine, a cold storage, and a freezer car.

What is claimed is:

1. A cooling device comprising a thermal insulating box, a cooling coil part of a cooling coil disposed on at least one inner wall of the thermal insulating box, a fan arranged in front of the cooling coil part, and a cooling chamber as a space in front of the fan, where the fan discharges air into the cooling chamber to flow therein, wherein dry cooling air in the cooling coil part is sucked from a rear side of the fans and discharged into the cooling chamber;

air returning from the cooling chamber is divided into a first air volume corresponding to a volume of sucked air passed through the cooling coil part that is fed from the cooling chamber to the cooling coil part through areas not occupied by the cooling fan, and a second air volume that heads directly for the rear of the fan, wherein most of the air returning from the cooling chamber directly heads for the rear of the fan; and a speed at which the airflow is fed is set so as to permit vapor generated in the cooling chamber to solidify before the vapor is brought into contact with the cooling coil.

2. The cooling device according to claim 1, wherein a speed that the vapor solidifies before making contact with the cooling coil is more than 0 m/min. but not more than 5 m/min.

3. The cooling device according to claim 1, wherein a speed that the vapor solidifies before making contact with the cooling coil is from 0.5 m/min. to 3.5 m/min.

4. The cooling device according to claim 1, wherein an area of airflow sucked from the cooling coil part is smaller than an area of airflow fed to the cooling coil part.

5. The cooling device according to claim 1, wherein a plurality of the cooling fans are arranged in front of the cooling coil, and the respective cooling fans are attached with an inclination to the cooling coil so that cold air discharged from the cooling fans intersect.

6. The cooling device according to claim 1, wherein a clearance is formed between a rear side of the cooling coil and an inner wall of the chamber.

7. The cooling device according to claim 6, wherein the clearance is in the range from 20 to 50 mm.

8. The cooling device according to claim 1, wherein the cooling device is selected from the group consisting of a refrigerator, a freezer, a refrigeration device, a refrigeration device for a automatic vending machine, a cold storage, a cool-keeping car, and a freezer car.

9. The cooling device according to claim 8, wherein the refrigerator and the freezer are intended for home use.

10. The cooling device according to claim 1, wherein power input of a heater for defrosting the cooling coil is unnecessary in a steady state.

11. The cooling device according to claim 1, further comprising a partition to divide the thermal insulating box into a cooling space and an inner wall side space outside of the cooling space, and also a ventilating hole to pass air between the cooling space and the inner wall side space, wherein the cooling coil is arranged with a rear side facing the inner wall side space, adjacent to the wall, and a front side is combined with an inner periphery of an opening formed at the partition; and the cooling fan is arranged in front of the cooling coil and set to rotate to discharge air behind the fan directly forward.

12. The cooling device according to claim 11, wherein the cold air discharged from the cooling fan is reflected by a wall facing the cooling fan and returns to the cooling fan.

13. The cooling device according to claim 11, further comprising a conveyor to convey a material to be cooled in the cooling space, and the cooling fan is adjacent to the conveyor.

14. A cooling device comprising a thermal insulating box, a cooling coil part of a cooling coil disposed on at least one inner wall of the thermal insulating box, a fan arranged in front of the cooling coil part, and a cooling chamber as a space in front of the fan, where the fan discharges air into the cooling chamber to flow therein, wherein
   dry cooling air in the cooling coil part is sucked from a rear side of the fans and discharged into the cooling chamber;
   an air volume corresponding to a volume of sucked air passed through the cooling coil part is fed from the cooling chamber to the cooling coil part through areas not occupied by the cooling fan;
   a speed at which the airflow is fed is set so as to permit vapor generated in the cooling chamber to solidify before the vapor is brought into contact with the cooling coil;
   further comprising a partition to divide the thermal insulating box into a cooling space and an inner wall side space outside of the cooling space, and also a ventilating hole to pass air between the cooling space and the inner wall side space, wherein
       the cooling coil is arranged with a rear side facing the wall side space, adjacent to the wall, and a front side is combined with an inner periphery of an opening formed at the partition;
       the cooling fan is arranged in front of the cooling coil and set to rotate to discharge air behind the fan directly forward;
   further comprising a conveyor to convey a material to be cooled in the cooling space, and the cooling fan is adjacent to the conveyor;
   further comprising a rotating drum disposed in the cooling space and a belt-driving attached spirally to the rotating drum, and the conveyer circulates while moving spirally on the belt-driving plate by a rotation of the rotation drum.

15. The cooling device according to claim 14, wherein a plurality of the rotating drums are disposed respectively in separate cooling spaces, the respective rotating drums have cooling coils and cooling fans, the belt-driving plates of adjacent rotating drums spiral in a direction reverse to each other, a belt is bridged from one of the belt-driving plates to an adjacent belt-driving plate, and the belt circulates while moving on the belt-driving plates of the respective rotating drums due to the rotation in the identical direction of the rotating drums.

16. The cooling device according to claim 15, comprising even numbers of the rotating drums and also an inlet and an outlet for materials to be cooled, and the inlet and outlet are formed in the thermal insulating box at substantially the same height.

17. The cooling device according to claim 14, wherein a plurality of the cooling coils and cooling fans are arranged along an outer periphery of the belt-driving plates.

18. The cooling device according to claim 14, wherein the cooling coils are disposed at substantially the same height of the bottom to top steps of the belt-driving plates, and the plural cooling fans are arranged in front of the cooling coils so that a volume of wind to the respective steps of the belt-driving plate are substantially equal.

19. The cooling device according to claim 14, wherein a stopper is disposed on a belt in order to prevent the material from sliding off.

20. The cooling device according to claim 13, wherein the conveyor is a belt circulating while moving in a straight line horizontally.

21. The cooling device according to claim 20, wherein the cooling coils are disposed at both sides of the belt.

22. The cooling device according to claim 21, wherein the respective cooling fans in front of the cooling coil oppose each other with the belt in between.

23. A cooling method using a cooling device comprising a thermal insulating box, a cooling coil part of a cooling coil disposed on at least one inner wall of the thermal insulating box, a fan arranged in front of the cooling coil part, and a cooling chamber as a space in front of the fan, where the fan discharges air into the cooling chamber to flow therein and most of the airflow is discharged again by the fan without being returned into the cooling coil part, wherein
   the flowing air discharged again into the cooling chamber and the flowing air sucked from the cooling coil are joined before being discharged into the cooling chamber;
   an air volume corresponding to a volume of sucked air passed through the cooling coil part is fed from the cooling chamber to the cooling coil part through areas not occupied by the cooling fan; and
   the speed at which the air volume is fed is set so as to permit vapor generated in the cooling chamber to solidify before the vapor is brought into contact with the cooling coil.

24. The cooling method according to claim 23, wherein a speed for the vapor to solidify before making contact with the cooling coil is more than 0 m/min. but not more than 5 m/min.

25. The cooling method according to claim 23, wherein a speed for the vapor to solidify before making contact with the cooling coil ranges from 0.5 m/min. to 3.5 m/min.

* * * * *

UNITED STATES PATENT AND TRADEMARK OFFICE
CERTIFICATE OF CORRECTION

PATENT NO.   : 6,427,455 B1                                                              Page 1 of 1
DATED        : August 6, 2002
INVENTOR(S)  : Yasuo Furubayashi It is certified that error appears in the above-identified patent and that said Letters Patent is hereby corrected as shown below:

<u>Title page,</u>
Item [73], please correct the spelling of "Shoki" to -- Shoji --

Signed and Sealed this

Twenty-seventh Day of May, 2003

JAMES E. ROGAN
*Director of the United States Patent and Trademark Office*